(12) United States Patent
Roumeliotis et al.

(10) Patent No.: US 12,442,638 B2
(45) Date of Patent: Oct. 14, 2025

(54) VISION-AIDED INERTIAL NAVIGATION SYSTEM FOR GROUND VEHICLE LOCALIZATION

(71) Applicant: Regents of the University of Minnesota, Minneapolis, MN (US)

(72) Inventors: Stergios I. Roumeliotis, St. Paul, MN (US); Kejian J. Wu, Minneapolis, MN (US); Chao Guo, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 18/443,035

(22) Filed: Feb. 15, 2024

(65) Prior Publication Data

US 2024/0230335 A1    Jul. 11, 2024

Related U.S. Application Data

(63) Continuation of application No. 16/425,422, filed on May 29, 2019, now Pat. No. 11,940,277.
(Continued)

(51) Int. Cl.
*G01C 21/00* (2006.01)
*G01C 21/16* (2006.01)
(Continued)

(52) U.S. Cl.
CPC ......... *G01C 21/1656* (2020.08); *G01C 21/28* (2013.01); *G06T 7/246* (2017.01);
(Continued)

(58) Field of Classification Search
CPC .... G01C 21/1656; G01C 21/28; G06T 7/246; G06T 7/277; G06T 7/73;
(Continued)

(56) References Cited

U.S. PATENT DOCUMENTS

| 5,847,755 A | 12/1998 | Wixson et al. |
| 6,028,608 A * | 2/2000 | Jenkins .................. G06T 15/00 |
| | | 345/619 |

(Continued)

FOREIGN PATENT DOCUMENTS

| JP | 2022519194 A | 3/2022 |
| WO | 2000034803 A2 | 6/2000 |

(Continued)

OTHER PUBLICATIONS

Pillai, S et al. Towards Visual Ego-motion Learning in Robots. 2017 IEEE/RSJ International Conference on Intelligent Robots and Systems Sep. 24-28, 2017. Vancouver, BC, Canada [online], [retrieved on Nov. 3, 2022]. Retrieved from Internet <https://ieeexplore.ieee.org/stamp/stamp.jsp?arnumber=8206441> (Year: 2017).*

(Continued)

*Primary Examiner* — Peter D Nolan
*Assistant Examiner* — Peter Y Ning
(74) *Attorney, Agent, or Firm* — KPPB LLP

(57) ABSTRACT

A vision-aided inertial navigation system (VINS) comprises an image source for producing image data along a trajectory. The VINS further comprises an inertial measurement unit (IMU) configured to produce IMU data indicative of motion of the VINS and an odometry unit configured to produce odometry data. The VINS further comprises a processor configured to compute, based on the image data, the IMU data, and the odometry data, state estimates for a position and orientation of the VINS for poses of the VINS along the trajectory. The processor maintains a state vector having states for a position and orientation of the VINS and positions within the environment for observed features for a sliding window of poses. The processor applies a sliding window filter to compute, based on the odometry data,
(Continued)

constraints between the poses within the sliding window and compute, based on the constraints, the state estimates.

18 Claims, 7 Drawing Sheets

Related U.S. Application Data

(60) Provisional application No. 62/677,438, filed on May 29, 2018.

(51) Int. Cl.
<table>
<tr><td>G01C 21/28</td><td>(2006.01)</td></tr>
<tr><td>G06T 7/246</td><td>(2017.01)</td></tr>
<tr><td>G06T 7/277</td><td>(2017.01)</td></tr>
<tr><td>G06T 7/73</td><td>(2017.01)</td></tr>
<tr><td>G07C 5/08</td><td>(2006.01)</td></tr>
</table>

(52) U.S. Cl.
CPC .............. *G06T 7/277* (2017.01); *G06T 7/73* (2017.01); *G07C 5/08* (2013.01)

(58) Field of Classification Search
CPC ........... G06T 2207/30241; G06T 2207/30244; G07C 5/08
See application file for complete search history.

(56) References Cited

U.S. PATENT DOCUMENTS

| | | | |
|---|---|---|---|
| 6,104,861 A | 8/2000 | Tsukagoshi | |
| 6,496,778 B1 | 12/2002 | Lin | |
| 7,015,831 B2 | 3/2006 | Karlsson et al. | |
| 7,162,338 B2 | 1/2007 | Goncalves et al. | |
| 7,747,151 B2 | 6/2010 | Kochi et al. | |
| 7,991,576 B2 | 8/2011 | Roumeliotis | |
| 8,510,039 B1 | 8/2013 | Troy et al. | |
| 8,577,539 B1 | 11/2013 | Morrison et al. | |
| 8,676,498 B2* | 3/2014 | Ma | G05D 1/027 353/30 |
| 8,761,439 B1 | 6/2014 | Kumar et al. | |
| 8,965,682 B2 | 2/2015 | Tangirala et al. | |
| 8,996,311 B1 | 3/2015 | Morin et al. | |
| 9,026,263 B2 | 5/2015 | Hoshizaki | |
| 9,031,809 B1 | 5/2015 | Kumar et al. | |
| 9,227,361 B2 | 1/2016 | Choi et al. | |
| 9,243,916 B2 | 1/2016 | Roumeliotis et al. | |
| 9,303,999 B2 | 4/2016 | Hesch et al. | |
| 9,547,910 B2* | 1/2017 | Hamza | G06T 7/20 |
| 9,607,401 B2 | 3/2017 | Roumeliotis et al. | |
| 9,658,070 B2 | 5/2017 | Roumeliotis et al. | |
| 9,678,102 B2* | 6/2017 | Ho | G01P 21/00 |
| 9,709,404 B2 | 7/2017 | Roumeliotis et al. | |
| 9,766,074 B2 | 9/2017 | Roumeliotis et al. | |
| 9,996,941 B2 | 6/2018 | Roumeliotis et al. | |
| 10,012,504 B2 | 7/2018 | Roumeliotis et al. | |
| 10,203,209 B2 | 2/2019 | Roumeliotis et al. | |
| 10,254,118 B2 | 4/2019 | Roumeliotis et al. | |
| 10,267,924 B2* | 4/2019 | Ramanandan | G01S 19/52 |
| 10,339,708 B2 | 7/2019 | Lynen et al. | |
| 10,371,529 B2 | 8/2019 | Roumeliotis et al. | |
| 10,670,404 B2 | 6/2020 | Roumeliotis et al. | |
| 11,940,277 B2 | 3/2024 | Roumeliotis et al. | |
| 2002/0198632 A1 | 12/2002 | Breed et al. | |
| 2003/0149528 A1 | 8/2003 | Lin | |
| 2004/0073360 A1 | 4/2004 | Foxlin | |
| 2004/0167667 A1 | 8/2004 | Goncalves et al. | |
| 2005/0013583 A1 | 1/2005 | Itoh | |
| 2007/0038374 A1 | 2/2007 | Belenkii et al. | |
| 2008/0167814 A1 | 7/2008 | Samarasekera et al. | |
| 2008/0265097 A1 | 10/2008 | Stecko et al. | |
| 2008/0279421 A1 | 11/2008 | Hamza et al. | |
| 2009/0212995 A1 | 8/2009 | Wu et al. | |
| 2009/0248304 A1 | 10/2009 | Roumeliotis et al. | |
| 2010/0110187 A1 | 5/2010 | Von et al. | |
| 2010/0211316 A1 | 8/2010 | Da et al. | |
| 2010/0220176 A1 | 9/2010 | Ziemeck et al. | |
| 2011/0178708 A1 | 7/2011 | Zhang et al. | |
| 2011/0206236 A1 | 8/2011 | Center, Jr. | |
| 2011/0238307 A1 | 9/2011 | Psiaki et al. | |
| 2012/0121161 A1 | 5/2012 | Eade et al. | |
| 2012/0194517 A1 | 8/2012 | Izadi et al. | |
| 2012/0203455 A1 | 8/2012 | Louis et al. | |
| 2013/0138264 A1 | 5/2013 | Hoshizaki | |
| 2013/0304383 A1 | 11/2013 | Bageshwar et al. | |
| 2013/0335562 A1 | 12/2013 | Ramanandan et al. | |
| 2014/0341465 A1* | 11/2014 | Li | G01C 21/1656 382/160 |
| 2014/0372026 A1 | 12/2014 | Georgy et al. | |
| 2015/0201180 A1* | 7/2015 | Mourikis | H04N 23/90 348/46 |
| 2015/0219767 A1 | 8/2015 | Humphreys et al. | |
| 2015/0356357 A1 | 12/2015 | McManus et al. | |
| 2016/0140729 A1* | 5/2016 | Soatto | G06T 7/277 348/135 |
| 2016/0161260 A1* | 6/2016 | Mourikis | G01C 21/1656 701/500 |
| 2016/0364990 A1 | 12/2016 | Khaghani et al. | |
| 2017/0176189 A1 | 6/2017 | D'aquila | |
| 2017/0336511 A1 | 11/2017 | Nerurkar et al. | |
| 2018/0023953 A1 | 1/2018 | Roumeliotis et al. | |
| 2018/0073891 A1* | 3/2018 | Max | B62D 15/021 |
| 2018/0082137 A1 | 3/2018 | Melvin et al. | |
| 2018/0087907 A1* | 3/2018 | DeBitetto | G01S 19/46 |
| 2018/0112985 A1 | 4/2018 | Madison | |
| 2018/0113469 A1* | 4/2018 | Madison | G01C 21/1656 |
| 2018/0211137 A1 | 7/2018 | Hesch et al. | |
| 2018/0259341 A1 | 9/2018 | Aboutalib et al. | |
| 2018/0328735 A1 | 11/2018 | Roumeliotis et al. | |
| 2019/0154449 A1 | 5/2019 | Roumeliotis et al. | |
| 2019/0178646 A1 | 6/2019 | Roumeliotis et al. | |
| 2019/0234746 A1* | 8/2019 | Zhang | G06T 7/73 |
| 2019/0346269 A1* | 11/2019 | Mohr | G01C 21/1656 |
| 2019/0368879 A1 | 12/2019 | Roumeliotis et al. | |
| 2019/0392630 A1 | 12/2019 | Sturm et al. | |
| 2021/0004979 A1 | 1/2021 | Valentin et al. | |
| 2021/0319568 A1* | 10/2021 | Ellingson | G06T 7/277 |

FOREIGN PATENT DOCUMENTS

| | | |
|---|---|---|
| WO | 2015013418 A2 | 1/2015 |
| WO | 2015013534 A1 | 1/2015 |
| WO | 2018026544 A1 | 2/2018 |

OTHER PUBLICATIONS

Wu, K et al. VINS on Wheels, 2017 IEEE International Conference on Robotics and Automation (ICRA) May 29-Jun. 3, 2017 Singapore [online]. Retrived on Nov. 5, 2023]. Retrived from Internet <https://ieeexplore.ieee.org/stamp/stamp.jsp?tp=&arnumber=7989603> (Year: 2017).*

Zhang, M et al, Vision-Aided Localization For Ground Robots, 2019 IEEE/RSJ International Conference on Intelligent Robots and Systems, Nov. 4-8, 2019, Macau, China [online], [retrieved on Nov. 5, 2023]. Retrieved from Internet <https://ieeexplore.ieee.org/stamp/stamp.jsp?tp=&arnumber=8968521> (Year: 2019).*

Goldshtein et al., "Seeker Gyro Calibration via Model-Based Fusion of Visual and Inertial Data", 10th International Conference on Information Fusion, 2007, pp. 1-19.

Hesch et al., "Observability-constrained Vision-aided Inertial Navigation", University of Minnesota, Department of Computer Science and Engineering, MARS Lab, Feb. 2012, 24 pgs.

Higham, "Matrix Inversion", Chapter 14, Accuracy and Stability of Numerical Algorithms, Second Edition, ISBN 0-89871-521-0, 2002, 29 pgs. (Applicant points out, "continued in misc", in accordance with MPEP 609.04(a), that the year of publication, 2002, is sufficiently earlier than the effective U.S. filing date, so that the particular month of publication is not in issue.).

(56) References Cited

OTHER PUBLICATIONS

Kottas et al., "Efficient and Consistent Vision-aided Inertial Navigation using Line Observations", Department of Computer Science & Engineering, University of Minnesota, MARS Lab, Sep. 2012, TR-2012-002, 14 pgs.

Lupton et al., "Visual-Inertial-Aided Navigation for High-Dynamic Motion in Built Environments Without Initial Conditions", IEEE Transactions on Robotics, Feb. 2012, vol. 28, No. 1, pp. 61-76, 10.1109/TRO.2011.2170332.

Mur-Artal et al., "ORB-SLAM2: An Open-Source SLAM System for Monocular, Stereo and RGB-D Cameras", IEEE Transactions on Robotics, Jun. 2017, vol. 33, vol. 5, 9 pgs.

Oliensis, "A New Structure From Motion Ambiguity", IEEE Transactions on Pattern Analysis and Machine Intelligence, Jul. 2000, vol. 22, No. 7, 30 pgs.

Roumeliotis et al., "Augmenting Inertial Navigation With Image-Based Motion Estimation", IEEE International Conference on Robotics and Automation, 2002, vol. 4, 8 pgs. (Applicant points out that, in accordance with MPEP 609.04(a), "continued in misc.", the 2002 year of publication is sufficiently earlier than the effective U.S. filing date and any foreign priority date of Feb. 21, 2013 so that the particular month of publication is not in issue.).

Filing Receipt and Filed Application for U.S. Appl. No. 61/040,473, filed Mar. 28, 2008, mailed May 21, 2008.

U.S. Appl. No. 16/425,422, filed May 29, 2019.

"Kalman filter", Wikipedia, the Free Encyclopedia, accessed from https://en.wikipedia.org/w/index.php?title=kalman_filter&oldid=730505034 Jul. 19, 2016, 30 pgs.

"Project Tango", retrieved from https://www.google.com/atap/projecttango on Nov. 2, 2015, 4 pgs.

Agarwal et al., "A Survey of Geodetic Approaches to Mapping and the Relationship to Graph-Based SLAM", IEEE Robotics and Automation Magazine, Sep. 2014, vol. 31, 17 pgs.

Ait-Aider et al., "Simultaneous object pose and velocity computation using a single view from a rolling shutter camera", Proceedings of the IEEE European Conference on Computer Vision, May 7-13, 2006, pp. 56-68.

Antone, "Robust Camera Pose Recovery Using Stochastic Geometry", Massachusetts Institute of Technology, Apr. 24, 2001, 187 pgs.

Ayache et al., "Maintaining Representations of the Environment of a Mobile Robot", IEEE Transactions on Robotics and Automation, Dec. 1989, vol. 5, No. 6, pp. 804-819.

Bailey et al., "Simultaneous Localisation and Mapping (SLAM): Part II", IEEE Robotics and Automation Magazine, Sep. 2006, vol. 13, No. 3, 10 pgs.

Baker et al., "Removing rolling shutter wobble", Proceedings of the IEEE Conference on Computer Vision and Pattern Recognition, Jun. 13-18, 2010, pp. 2392-2399.

Bar-Shalom et al., "Estimation with Applications to Tracking and Navigation", Chapter 7, Estimation with Applications to Tracking and Navigation, Jul. 2001, ISBN 0-471-41655-X, 20 pgs.

Bartoli et al., "Structure-from-Motion Using Lines: Representation, Triangulation, and Bundle Adjustment", Computer Vision and Image Understanding, 2005, vol. 100, pp. 416-441.

Bayard et al., "An Estimation Algorithm for Vision-Based Exploration of Small Bodies in Space", American Control Conference, Jun. 8-10, 2005, pp. 4589-4595.

Bierman, "Factorization Methods for Discrete Sequential Estimation", Mathematics in Science and Engineering, Academic Press, vol. 128, 1977, 259 pgs.

Bloesch et al., "Iterated Extended Kalman Filter Based Visual-Inertial Odometry Using Direct Photometric Feedback", International Journal of Robotics Research, Sep. 2017, vol. 36, 19 pgs.

Bloesch et al., "Robust Visual Inertial Odometry Using a Direct EKF-Based Approach", Proceeding of the IEEE/RSJ International Conference on Intelligent Robots and Systems, Sep. 2015, 7 pgs.

Bouguet, "Camera Calibration Toolbox for Matlab", Retrieved from: http://www.vision.caltech.edu/bouguetj/calib_doc/, 2004, Last Updated: Oct. 14, 2015, 5 pgs.

Boyd et al., "Convex Optimization", Cambridge University Press, 2004, 730 pp. (Applicant points out that, in accordance with MPEP 609.04(a), the 2004 year "continued in misc", publication is sufficiently earlier than the effective U.S. filing date and any foreign priority date of Feb. 21, 2013, so that the particular month of publication is not in issue).

Breckenridge, "Interoffice Memorandum to T. K. Brown, Quaternions—Proposed Standard Conventions", IOM 343-79-1199, Oct. 31, 1979, 12 pgs.

Burri et al., "The EuRoC Micro Aerial Vehicle Datasets", International Journal of Robotics Research, 10, Sep. 2016, vol. 35, No. 10, 9 pgs.

Canny, "A Computational Approach to Edge Detection", IEEE Transactions on Pattern Analysis and Machine Intelligence, Nov. 1986 vol. 8, No. 6, pp. 679-698.

Chauhan et al., "Femoral Artery Pressures Are More Reliable Than Radial Artery Pressures on Initiation of Cardiopulmonary Bypass", Journal of Cardiothoracic and Vascular Anesthesia, Jun. 2000, vol. 14, No. 3, 3 pgs.

Chen, "Pose Determination from Line-to-Plane Correspondences: Existence Condition and Closed-Form Solutions", Proceedings on the 3rd International Conference on Computer Vision, Dec. 4-7, 1990, pp. 374-378.

Chen et al., "Local Observability Matrix and its Application to Observability Analyses", Proceedings of the 16th Annual Conference IEEE Industrial Electronics Society, Nov. 1990, 4 pgs.

Chiu et al., "Robust vision-aided navigation using sliding-window factor graphs", 2013 IEEE International Conference on Robotics and Automation, May 6-10, 2013, pp. 46-53.

Chiuso et al., "Structure From Motion Causally Integrated Over Time", IEEE Transactions on Pattern Analysis and Machine Intelligence, Apr. 2002, vol. 24, No. 4, pp. 523-535.

Comport et al., "Accurate Quadrifocal Tracking for Robust 3D Visual Odometry", IEEE International Conference on Robotics and Automation, 2007, pp. 40-45.

Cortes et al., "ADVIO: An Authentic Dataset for Visual-Inertial Odometry", Obtained from arXiv:1807.09828, Jul. 25, 2018, 25 pgs.

Cumani et al., "Integrating Monocular Vision and Odometry for SLAM", WSEAS Transactions on Computers, 2003, 6 pgs.

Davison et al., "Simultaneous Localisation and Map-Building Using Active Vision", Jun. 2001, 18 pgs.

Deans, "Maximally Informative Statistics for Localization and Mapping", Proceedings of the 2002 IEEE International Conference on Robotics & Automation, May 2002, pp. 1824-1829.

Dellaert et al., "Square Root SAM: Simultaneous Localization and Mapping via Square Root Information Smoothing", International Journal of Robotics and Research, Dec. 2006, vol. 25, No. 12, pp. 1181-1203.

Diel, "Stochastic Constraints for Vision-Aided Inertial Navigation", Massachusetts Institute of Technology, Department of Mechanical Engineering, Master Thesis, Jan. 2005, 110 pgs.

Diel et al., "Epipolar Constraints for Vision-Aided Inertial Navigation", Seventh IEEE Workshops on Applications of Computer Vision (WACV/Motion'05), vol. 1, 2005, pp. 221-228.

Dong-Si et al., "Motion Tracking with Fixed-lag Smoothing: Algorithm and Consistency Analysis", Proceedings of the IEEE International Conference on Robotics and Automation, May 9-13, 2011, 8 pgs.

Durrant-Whyte et al., "Simultaneous Localisation and Mapping (SLAM): Part I The Essential Algorithms", IEEE Robotics & Automation Magazine, Jun. 2006, vol. 13, No. 2, pp. 99-110.

Dutoit et al., "Consistent Map-based 3D Localization on Mobile Devices", Proceedings of the IEEE International Conference on robotics and Automation, May 2017, 8 pgs.

Eade et al., "Monocular SLAM as a Graph of Coalesced Observations", IEEE 11th International Conference on Computer Vision, 2007, pp. 1-8.

Eade et al., "Scalable Monocular SLAM", Proceedings of the 2006 IEEE Computer Society Conference on Computer Vision and Pattern Recognition (CVPR '06), Jun. 17-22, 2006, vol. 1, 8 pgs.

(56) References Cited

OTHER PUBLICATIONS

Engel et al., "Direct Sparse Odometry", IEEE Transactions on Pattern Analysis and Machine Intelligence, Mar. 2018, vol. 40, No. 3, 15 pgs.

Engel et al., "LSD-SLAM: Large-Scale Direct Monocular SLAM", Proceedings of the European Conference on Computer Vision, Sep. 2014, 16 pgs.

Engel et al., "Semi-Dense Visual Odometry for a Monocular Camera", Proceedings of the IEEE International Conference on Computer Vision, Dec. 2013, 8 pgs.

Erdogan et al., "Planar Segmentation of RGBD Images using Fast Linear Fitting and Markov Chain Monte Carlo", Proceedings of the IEEE International Conference on Computer and Robot Vision, May 27-30, 2012, pp. 32-39.

Eustice et al., "Exactly Sparse Delayed-state Filters for View-based SLAM", IEEE Transactions on Robotics, Dec. 2006, vol. 22, No. 6, pp. 1100-1114.

Eustice et al., "Visually Navigating the RMS Titanic With SLAM Information Filters", Proceedings of Robotics Science and Systems, Jun. 2005, 9 pgs.

Forster et al., "IMU Preintegration on Manifold for Efficient Visual-Inertial Maximum-a-posteriori Estimation", Proceedings of Robotics: Science and Systems, Jul. 2015, 10 pgs.

Forster et al., "SVO: Semi-Direct Visual Odometry for Monocular and Multi-Camera Systems", IEEE Transactions on Robotics, Apr. 2017, vol. 33, No. 2, 18 pgs.

Furgale et al., "Unified temporal and spatial calibration for multi-sensor systems", Proceedings of the IEEE/RSJ International Conference on Intelligent Robots and Systems, Nov. 3-7, 2013, pp. 1280-1286.

Garcia et al., "Augmented State Kalman Filtering for AUV Navigation", Proceedings of the 2002 IEEE International Conference on Robotics & Automation, May 2002, 6 pgs.

George et al., "Inertial Navigation Aided by Monocular Camera Observations of Unknown Features", IEEE International Conference on Robotics and Automation, Roma, Italy, Apr. 10-14, 2007, pp. 3558-3564.

Goldshtein et al., "Seeker Gyro Calibration via Model-Based Fusion of Visual and Inertial Data", 10th International Conference on Information Fusion, 2007, pp. 1-8.

Golub et al., "Matrix Computations, Fourth Edition", The Johns Hopkins University Press, 2013, 780 pgs., (Applicant points out, in accordance with JVIPEP 609.04(a), that the year of publication, 2013, is sufficiently earlier than the effective U.S. filing date, so that the particular month of publication is not in issue).

Golub et al., "Matrix Computations, Third Edition", The Johns Hopkins University Press, 2012, 723 pgs. (Applicant points out that, in accordance with MPEP 609.04(a), the 2012 year of publication is sufficiently earlier than the effective U.S. filing date and any foreign "continued in misc", priority date of Feb. 21, 2013, so that the particular month of publication is not in issue).

Golub et al., "Matrix Multiplication Problems", Chapter 1, Matrix Computations, Third Edition, ISBN 0-8018-5413-X, 1996, 47 pgs., (Applicant points out, in accordance with MPEP 609.04(a), that the year of publication "continued in misc", 1996, is sufficiently earlier than the effective U.S. filing date, so that the particular month of publication is not in issue).

Guivant et al., "Optimization of the Simultaneous Localization and Map-Building Algorithm for Real-Time Implementation", IEEE Transactions on Robotics and Automation, Jun. 2001, vol. 17, No. 3, 16 pgs.

Guo et al., "An Analytical Least-Squares Solution to the Odometer-Camera Extrinsic Calibration Problem", Proceedings of the IEEE International Conference on Robotics and Automation, May 2012, 7 pgs.

Guo et al., "Efficient Visual-Inertial Navigation using a Rolling-Shutter Camera with Inaccurate Timestamps", Proceedings of Robotics: Science and Systems, Jul. 2014, 9 pgs.

Guo et al., "Efficient Visual-Inertial Navigation Using a Rolling-Shutter Camera with Inaccurate Timestamps", University of Minnesota, Multiple Autonomous Robotic Systems Laboratory Technical Report No. 2014-001, Feb. 2014, 9 pgs.

Guo et al., "IMU-RGBD Camera 3D Pose Estimation and Extrinsic Calibration: Observability Analysis and Consistency Improvement", Proceedings of the IEEE International Conference on Robotics and Automation. May 6-10, 2013, pp. 2935-2942.

Guo et al., "Observability-constrained EKF Implementation of the IMU-RGBD Camera Navigation Using Point and Plane Features", Technical Report, University of Minnesota, Mar. 2013, 6 pgs.

Guo et al., "Resource-Aware Large-Scale Cooperative 3D Mapping from Multiple Cell Phones", Multiple Autonomous Robotic Systems (MARS) Lab, ICRA Poster May 26-31, 2015, 1 pg.

Gupta et al., "Terrain Based Vehicle Orientation Estimation Combining Vision and Inertial Measurements", Journal of Field Robotics vol. 25, No. 3, 2008, pp. 181-202.

Harris et al., "A combined corner and edge detector", Proceedings of the Alvey Vision Conference, Aug. 31-Sep. 2, 1988, pp. 147-151.

Hermann et al., "Nonlinear Controllability and Observability", IEEE Transactions on Automatic Control, Oct. 1977, vol. AC-22, No. 5, pp. 728-740, doi: 10.1109/TAC.1977.1101601.

Herrera et al., "Joint Depth and Color Camera Calibration with Distortion Correction", IEEE Transactions on Pattern Analysis and Machine Intelligence, Oct. 2012, vol. 34, No. 10, pp. 2058-2064.

Hesch et al., "Camera-IMU-Based Localization: Observability Analysis and Consistency Improvement", The International Journal of Robotics Research, 2014, vol. 33, No. 1, pp. 182-201.

Hesch et al., "Consistency Analysis and Improvement for Single-Camera Localization", IEEE Computer Society Conference on Computer Vision and Pattern Recognition Workshops, 2012, pp. 15-22.

Hesch et al., "Consistency analysis and improvement of vision-aided inertial navigation", IEEE Transactions on Robotics, Feb. 2014, vol. 30, No. 1, pp. 158-176.

Hesch et al., "Observability-constrained Vision-aided Inertial Navigation", University of Minnesota, Department of Computer Science and Engineering, MARS Lab, Feb. 2012, 24 pp.

Hesch et al., "Towards Consistent Vision-aided Inertial Navigation", Proceedings of the 10th International Workshop on the Algorithmic Foundations of Robotics, Jun. 13-15, 2012, 16 pgs.

Heyden et al., "Structure and Motion in 3D and 2D from Hybrid Matching Constraints", 2007, 14 pgs.

Higham, "Matrix Inversion", Chapter 14, Accuracy and Stability of Numerical Algorithms, Second Edition, ISBN 0-89871-521-0, 2002, 29 pp. (Applicant points out, "continued in misc", in accordance with MPEP 609.04(a), that the year of publication, 2002, is sufficiently earlier than the effective U.S. filing date, so that the particular month of publication is not in issue).

Horn, "Closed-form solution of absolute orientation using unit quaternions", Journal of the Optical Society of America A, vol. 4, Apr. 1987, 14 pgs.

Horn et al., "Closed-form solution of absolute orientation using orthonormal matrices", Journal of the Optical Society of America A, Jul. 1988, vol. 5, No. 7, pp. 1127-1135.

Huang et al., "Observability-based rules for designing consistent EKF slam estimators", International Journal of Robotics Research, Apr. 2010, vol. 29, No. 5, pp. 502-528.

Huang et al., "Visual Odometry and Mapping for Autonomous Flight Using an RGB-D Camera", Proceedings of the International Symposium on Robotics Research, Aug. 28-Sep. 1, 2011, 16 pgs.

Huster et al., "Relative Position Sensing by Fusing Monocular Vision and Inertial Rate Sensors", Stanford University, Department of Electrical Engineering, Dissertation. Jul. 2003, 158 pgs.

Jia et al., "Probabilistic 3-D motion estimation for rolling shutter video rectification from visual and inertial measurements", Proceedings of the IEEE International Workshop on Multimedia Signal Processing, Sep. 2012, pp. 203-208.

Johannsson et al., "Temporally Scalable Visual Slam Using a Reduced Pose Graph", in Proceedings of the IEEE International Conference on Robotics and Automation, May 6-10, 2013, 8 pgs.

Jones et al., "Visual-Inertial Navigation, Mapping and Localization: A Scalable Real-time Causal Approach", International Journal of Robotics Research, Mar. 31, 2011, vol. 30, No. 4, pp. 407-430.

(56) References Cited

OTHER PUBLICATIONS

Julier, "A Sparse Weight Kalman Filter Approach to Simultaneous Localisation and Map Building", Proceedings of the IEEE/RSJ International Conference on Intelligent robots and Systems, Oct. 2001, vol. 3, 6 pgs.
Julier et al., "A Non-divergent Estimation Algorithm in the Presence of Unknown Correlations", Proceedings of the American Control Conference, Jun. 1997, vol. 4, 5 pgs.
Kaess et al., "iSAM: Incremental Smoothing and Mapping", IEEE Transactions on Robotics, Manuscript, Sep. 7, 2008, 14 pgs.
Kaess et al., "iSAM2: Incremental Smoothing and Mapping Using the Bayes Tree", International Journal of Robotics Research, vol. 31, No. 2, Feb. 2012, 19 pgs.
Kelly et al., "A general framework for temporal calibration of multiple proprioceptive and exteroceptive sensors", Proceedings of International Symposium on Experimental Robotics, Dec. 18-21, 2010, 15 pgs.
Kelly et al., "Visual-inertial sensor fusion: Localization, mapping and sensor-to-sensor self-calibration", International Journal of Robotics Research, Jan. 2011, vol. 30, No. 1, pp. 56-79.
Klein et al., "Improving the Agility of Keyframe-Based SLAM", ECCV 2008, Part II, LNCS 5303, pp. 802-815.
Klein et al., "Parallel Tracking and Mapping for Small AR Workspaces", Proceedings of the IEEE and ACM International Symposium on Mixed and Augmented Reality, Nov. 13-16, 2007, pp. 225-234.
Kneip et al., "Robust Real-Time Visual Odometry with a Single Camera and an IMU", Proceedings of the British Machine Vision Conference, Aug. 29-Sep. 2, 2011, pp. 16.1-16.11.
Konolige et al., "Efficient Sparse Pose Adjustment for 2D Mapping", Proceedings of the IEEE/RSJ International Conference on Intelligent Robots and Systems, Oct. 18-22, 2010, pp. 22-29.
Konolige et al., "FrameSLAM: from Bundle Adjustment to Real-Time Visual Mapping", IEEE Transactions on Robotics, Oct. 2008, vol. 24, No. 5, pp. 1066-1077.
Konolige et al., "View-based Maps", International Journal of Robotics Research, Jul. 2010, vol. 29, No. 8, pp. 941-957.
Kottas et al., "A Resource-aware Vision-aided Inertial Navigation System for Wearable and Portable Computers", IEEE International Conference on Robotics and Automation, Accepted Apr. 18, 2014, available online May 6, 2014, 3 pgs.
Kottas et al., "An Iterative Kalman Smoother for Robust 3D Localization and mapping", ISRR, Tech Report, Oct. 16, 2014, 15 pgs.
Kottas et al., "An iterative Kalman smoother for robust 3D localization on mobile and wearable devices", Proceedings of the IEEE International Conference on Robotics and Automation, May 26-30, 2015, pp. 6336-6343.
Kottas et al., "An Iterative Kalman Smoother for Robust 3D Localization on Mobile and Wearable devices", Submitted confidentially to International Conference on Robotics & Automation, ICRA, 15, May 5, 2015, 8 pgs.
Kottas et al., "Detecting and dealing with hovering maneuvers in vision-aided inertial navigation systems", Proceedings of the IEEE/RSJ International Conference on Intelligent Robots and Systems, Nov. 3-7, 2013, pp. 3172-3179.
Kottas et al., "Efficient and Consistent Vision-aided Inertial Navigation using Line Observations", Department of Computer Science & Engineering, University of Minnesota, MARS Lab, Sep. 2012, TR-2012-002, pp. 1540-1547.
Kottas et al., "On the Consistency of Vision-aided Inertial Navigation", Proceedings of the International Symposium on Experimental Robotics, Jun. 17- 20, 2012, 15 pgs.
Kummerle et al., "g2o: A General Framework for Graph Optimization", in Proceedings of the IEEE International Conference on Robotics and Automation, May 9-13, 2011, pp. 3607-3613.
Langelaan, "State Estimation for Autonomous Flight in Cluttered Environments", Stanford University, Department of Aeronautics and Astronautics, Dissertation, Mar. 2006, 128 pgs.

Latif et al., "Applying Sparse '1-Optimization to Problems in Robotics", ICRA 2014 Workshop on Long Term Autonomy, Jun. 2014, 3 pgs.
Lee et al., "Pose Graph-Based RGB-D SLAM in Low Dynamic Environments", ICRA Workshop on Long Term Autonomy, 2014, 19 pgs.
Leutenegger et al., "Keyframe-based visual-inertial odometry using nonlinear optimization", The International Journal of Robotics Research, Mar. 2015, vol. 34, No. 3, pp. 1-21, DOI: 10.1177/0278364914554813.
Li et al, "High-Precision, Consistent EKF-based Visual-Inertial Odometry", International Journal of Robotics Research, May 2013, vol. 32, No. 6, 33 pgs., DOI: 10.1177/0278364913481251.
Li et al., "3-D motion estimation and online temporal calibration for camera-IMU systems", Proceedings of the IEEE International Conference on Robotics and Automation, May 6-10, 2013, 8 pgs.
Li et al., "Improving the Accuracy of EKF-based Visual-Inertial Odometry", IEEE International Conference on Robotics and Automation, May 14-18, 2012, 8 pgs.
Li et al., "Optimization-Based Estimator Design for Vision-Aided Inertial Navigation", Proceedings of the Robotics: Science and Systems Conference, Jul. 9-13, 2012, 8 pgs.
Li et al., "Real-time Motion Tracking on a Cellphone using Inertial Sensing and a Rolling-Shutter Camera", 2013 IEEE International Conference on Robotics and Automation (ICRA), May 6-10, 2013, 8 pgs.
Li et al., "Vision-aided inertial navigation with rolling-shutter cameras", The International Journal of Robotics Research, retrieved from ijr.sagepub.com on May 22, 2015, 18 pgs.
Lim et al., "Zero-Configuration Indoor Localization over IEEE 802.11 Wireless Infrastructure", Jun. 23, 2008, 31 pgs.
Liu et al., "Estimation of Rigid Body Motion Using Straight Line Correspondences", Computer Vision, Graphics, and Image Processing, Jul. 1988, vol. 43, No. 1, pp. 37-52.
Liu et al., "ICE-BA: Incremental, Consistent and Efficient Bundle Adjustment for Visual-Inertial SLAM", Proceedings of the IEEE Conference on Computer Vision and Pattern Recognition, Jun. 2018, pp. 1974-1982.
Liu et al., "Multi-aided inertial navigation for ground vehicles in outdoor uneven environments", Proceedings of the IEEE International Conference on Robotics and Automation, Apr. 18-22, 2005, pp. 4703-4708.
Lowe, "Distinctive Image Features from Scale-Invariant Keypoints", Retrieved from: https://www.robots.ox.ac.uk/~vgg/research/affine/det_eval_files/lowe_ijcv2004.pdf, Jan. 5, 2004, Accepted for publication in the International Journal of Computer Vision, 2004, 28 pgs.
Lucas et al., "An iterative image registration technique with an application to stereo vision", Proceedings of 7th the International Joint Conference on Artificial Intelligence, 1981, pp. 121-130.
Lupton et al., "Visual-Inertial-Aided Navigation for High-Dynamic Motion in Built Environments Without Initial Conditions", IEEE Transactions on Robotics, Feb. 2012, vol. 28, No. 1, pp. 61-76, DOI: 10.1109/TRO.2011.2170332.
Lynen et al., "Get Out of My Lab: Large-scale, Real-Time Visual-Inertial Localization", Proceedings of robotics: Science and Systems, Jul. 2015, 10 pgs.
Martinelli, "Closed-form Solution of Visual-inertial structure from Motion", International Journal of Computer Vision, Jan. 2014, vol. 106, No. 2, 16 pgs.
Martinelli, "Vision and IMU Data Fusion: Closed-form Solutions for Attitude, Speed, Absolute Scale, and Bias Determination", IEEE Transactions on Robotics, Feb. 2012, vol. 28, No. 1, pp. 44-60, DOI: 10.1109/TRO.2011.2160468.
Matas et al., "Robust Detection of Lines Using the Progressive Probabilistic Hough Transformation", Computer Vision and Image Understanding, Apr. 2000, vol. 78, No. 1, pp. 119-137, doi: 10.1006.cviu.1999.0831.
Maybeck, "Stochastic models, estimation and control", Academy Press, May 28, 1979, vol. 1, Chapter 1, 19 pgs.

(56) References Cited

OTHER PUBLICATIONS

Mclauchlan, "The Variable State Dimension Filter Applied to Surface-Based Structure From Motion CVSSP Technical Report VSSP-TR-4/99", University of Surrey, Department of Electrical Engineering, Dec. 1999, 52 pgs.

Meltzer et al., "Edge Descriptors for Robust Wide-baseline Correspondence", IEEE Conference on Computer Vision and Pattern Recognition, Jun. 23-28, 2008, pp. 1-8.

Mirzaei et al., "A Kalman Filter-Based Algorithm for IMU-Camera Calibration: Observability Analysis and Performance Evaluation", IEEE Transactions on RoboticsOct. 2008, vol. 24, No. 5, pp. 1143-1156, doi: 10.1006.cviu.1999.0831.

Mirzaei et al., "Globally Optimal Pose Estimation from Line Correspondences", IEEE International Conference on Robotics and Automation, May 9-13, 2011, pp. 5581-5588.

Mirzaei et al., "Optimal Estimation of Vanishing Points in a Manhattan World", IEEE International Conference on Computer Vision, Nov. 6-13, 2011, pp. 2454-2461.

Montiel et al., "Unified Inverse Depth Parametrization for Monocular SLAM", Proceedings of Robotics: Science and Systems II (RSS-06), Aug. 16-19, 2006, 8 pgs.

Mourikis et al., "A Dual-Layer Estimator Architecture for Long-term Localization", Proceedings of the Workshop on Visual Localization for Mobile Platforms, Jun. 24-26, 2008, 8 pgs.

Mourikis et al., "A Multi-State Constraint Kalman Filter for Vision-aided Inertial Navigation", IEEE International Conference on Robotics and Automation, Apr. 10-14, 2007, pp. 3565-3572.

Mourikis et al., "A Multi-State Constraint Kalman Filter for Vision-aided Inertial Navigation", IEEE International Conference on Robotics and Automation, Sep. 28, 2006, 20 pgs.

Mourikis et al., "A Multi-State Constraint Kalman Filter for Vision-Aided Inertial Navigation", University of Minnesota, Dept. of Computer Science and Engineering, 2006, 20 pgs.

Mourikis et al., "On the Treatment of Relative-Pose Measurements for Mobile Robot Localization", Proceedings of the 2006 IEEE International Conference on Robotics and Automation, May 2006, pp. 2277-2284.

Mourikis et al., "SC-KF Mobile Robot Localization: A Stochastic Cloning Kalman Filter for Processing Relative-State Measurements", IEEE Transactions on Robotics, vol. 23. No. 4, Aug. 2007, pp. 717-730.

Mourikis et al., "Vision-Aided Inertial Navigation for Spacecraft Entry, Descent, and Landing", IEEE Transactions on Robotics, Apr. 2009, vol. 25, No. 2, pp. 264-280.

Mur-Artal et al., "ORB-SLAM: a Versatile and Accurate Monocular SLAM System", IEEE Transactions on Robotics, Oct. 2015, vol. 31, No. 5, 17 pgs.

Mur-Artal et al., "ORB-SLAM2: An Open-Source SLAM System for Monocular, Stereo and RGB-D Cameras", IEEE Transactions on Robotics, Jun. 2017, vol. 33, No. 5, pp. 1255-1262.

Mur-Artal et al., "Visual-inertial Monocular SLAM with Map Reuse", IEEE Robotics and Automation Letters, Apr. 2017, vol. 2, No. 2, 8 pgs.

Nerurkar et al., "C-KLAM: Constrained Keyframe Localization and Mapping for Long-Term Navigation", IEEE International Conference on Robotics and Automation, 2014, 3 pgs.

Nerurkar et al., "C-KLAM: Constrained Keyframe-Based Localization and Mapping", Proceedings of the IEEE International Conference on Robotics and Automation, May 31-Jun. 7, 2014, 6 pgs.

Nerurkar et al., "Power-SLAM: A Linear-Complexity, Anytime Algorithm for SLAM", International Journal of Robotics Research, May 2011, vol. 30, No. 6, 13 pgs.

Nister et al., "Scalable Recognition with a Vocabulary Tree", IEEE Computer Vision and Pattern Recognition, 2006, 8 pgs.

Nister et al., "Visual Odometry for Ground Vehicle Applications", Journal of Field Robotics, Jan. 2006, vol. 23, No. 1, 35 pgs.

Nocedal et al., "Numerical Optimization", 2nd Ed. Springer, 2006, 683 pgs., (Applicant points out, in accordance with MPEP 609.04(a), that the year of publication, 2006, is sufficiently earlier than the effective U.S. filing date, so that the month of publication is not in issue).

Oliensis, "A New Structure From Motion Ambiguity", IEEE Transactions on Pattern Analysis and Machine Intelligence, July 2000vol. 22, No. 7, 30 pgs.

Ong et al., "Six DoF Decentralised SLAM", Proceedings of the Australasian Conference on Robotics and Automation, 2003, 10 pp. (Applicant points out, in accordance with MPEP 609.04(a), continued in misc., that the year of publication, 2003, is sufficiently earlier than the effective U.S. filing date, so that the particular month of publication is not in issue).

Oth et al., "Rolling shutter camera calibration", Proceedings of the IEEE Conference on Computer Vision and Pattern Recognition, Jun. 23-28, 2013, pp. 1360-1367.

Perea et al., "Sliding Windows and Persistence: An Application of Topological Methods to Signal Analysis", Foundations of Computational: Mathematics, Nov. 25, 2013, 34 pgs.

Prazenica et al., "Vision-Based Kalman Filtering for Aircraft State Estimation and Structure From Motion", AIAA Guidance, Navigation, and Control Conference and Exhibit, Aug. 15-18, 2005, 13 pgs.

Qin et al., "VINS-Mono: A Robust and Versatile Monocular Visual-Inertial State Estimator", IEEE Transactions on RoboticsAug. 2018, vol. 34, No. 4, 17 pgs.

Ragab et al., "EKF Based Pose Estimation Using Two Back-to-Back Stereo Pairs", 14th IEEE International Conference on Image Processing, Sep. 16- 19, 2007, 4 pgs.

Randeniya, "Automatic Geo-Referencing by Integrating Camera Vision and Inertial Measurements", University of South Florida, Scholar Commons, Graduate Theses and Dissertations, 2007, 177 pgs.

Rosten et al., "Machine Learning for High-Speed Corner Detection", Proceedings of the 9th European Conference on Computer Vision, May 2006, 14 pgs.

Roumeliotis et al., Prosecution History for U.S. Appl. No. 12/383,371, filed Mar. 23, 2009, issued on Sep. 19, 2017, as U.S. Pat. No. 9,766,074, 608 pgs.

Roumeliotis et al., Prosecution History for U.S. Appl. No. 15/706,149, filed Sep. 15, 2017, issued on Jun. 2, 2020, as U.S. Pat. No. 10,670,404, 268 pgs.

Roumeliotis et al., "Augmenting Inertial Navigation With Image-Based Motion Estimation", IEEE International Conference on Robotics and Automation, 2002, vol. 4, pp. 8 (Applicant points out that, in accordance with MPEP 609.04(a), "continued in misc.", the 2002 year of publication is sufficiently earlier than the effective U.S. filing date and any foreign priority date of Feb. 21, 2013 so that the particular month of publication is not in issue).

Roumeliotis et al., "Stochastic Cloning: A Generalized Framework for Processing Relative State Measurements", Proceedings of the 2012 IEEE International Conference on Robotics and Automation, May 11-15, 2002, pp. 1788-1795.

Rublee et al., "ORB: An efficient alternative to SIFT or SURF", 2011 International Conference on Computer Vision, Nov. 6-13, 2011, Barcelona, Spain, pp. 2564-2571, DOI: 10.1109/ICCV.2011. 6126544.

Sartipi et al., "Decentralized Visual-Inertial Localization and Mapping on Mobile Devices for Augmented Reality", IEEE/RSJ International Conference on Intelligent Robots and Systems (IROS), 2019, 9 pgs.

Schmid et al., "Automatic Line Matching Across Views", Proceedings of the IEEE Computer Science Conference on Computer Vision and Pattern Recognition, Jun. 17-19, 1997, pp. 666-671.

Se et al., "Visual Motion Estimation and Terrain Modeling for Planetary Rovers", International Symposium on Artificial Intelligence for Robotics and Automation in Space, Munich, Germany, Sep. 2005, 8 pgs.

Servant et al., "Improving Monocular Plane-based SLAM with Inertial Measurements", 2010 IEEE/RSJ International Conference on Intelligent Robots and Systems, Oct. 18-22, 2010, pp. 3810-3815.

Shoemake et al., "Animating rotation with quaternion curves", ACM SIGGRAPH Computer Graphics, Jul. 22-26, 1985, vol. 19, No. 3, pp. 245-254.

(56) References Cited

OTHER PUBLICATIONS

Sibley et al., "Sliding Window Filter with Application to Planetary Landing", Journal of Field Robotics, Sep./Oct. 2010, vol. 27, No. 5, pp. 587-608.
Smith et al., "On the Representation and Estimation of Spatial Uncertainty", International Journal of Robotics Research, 1986, vol. 5, No. 4, pp. 56-68 (Applicant points out that, in accordance with MPEP 609.04(a), the 1986 year "continued in misc", of publication is sufficiently earlier than the effective U.S. filing date and any foreign priority date of Feb. 21, 2013 so that the particular month of publication is not in issue).
Smith et al., "Real-time Monocular Slam with Straight Lines", British Machine Vision Conference, Sep. 2006, vol. 1, pp. 17-26.
Soatto et al., "Motion Estimation via Dynamic Vision", IEEE Transactions on Automatic Control, vol. 41, No. 3, Mar. 1996, pp. 393-413.
Soatto et al., "Recursive 3-D Visual Motion Estimation Using Subspace Constraints", International Journal of Computer Vision, Mar. 1997, vol. 22, No. 3, pp. 235-259.
Spetsakis et al., "Structure from Motion Using Line Correspondences", International Journal of Computer Vision, Jun. 1990, vol. 4, No. 3, pp. 171-183.
Strelow, "Motion Estimation From Image and Inertial Measurements", Carnegie Mellon University, School of Computer Science, DissertationNov. 2004, CMU-CS-04-178, 164 pgs.
Sturm, "Tracking and Mapping in Project Tango", Project Tango, accessed from https://jsturm.de/publications/data/sturm2015_dagstuhl.pdf accessed on Jun. 1, 2021, published 2015, (Applicant points out, in accordance with MPEP 509.04(a), that the year of publication, 2015, is sufficiently earlier than the effective U.S. filing dale, so that the particular month of publication is not in issue.), 29 pgs.
Taylor et al., "Parameterless Automatic Extrinsic Calibration of Vehicle Mounted Lidar-Camera Systems", Conference Paper, Mar. 2014, 3 pgs.
Taylor et al., "Structure and Motion from Line Segments in Multiple Images", IEEE Transactions on Pattern Analysis and Machine Intelligence, Nov. 1995, vol. 17, No. 11, pp. 1021-1032.
Thorton et al., "Triangular Covariance Factorizations for Kalman Filtering", Technical Memorandum 33-798, National Aeronautics and Space Administration, Oct. 15, 1976, 212 pgs.
Thrun et al., "The Graph SLAM Algorithm with Applications to Large-Scale Mapping of Urban Structures", The International Journal of Robotics Research, May 2006, vol. 25, No. 5-6, pp. 403-429.
Torr et al., "Robust Parameterization and Computation of the Trifocal Tensor", Image and Vision Computing, vol. 15, No. 8, Aug. 1997, 25 pgs.
Trawny et al., "Indirect Kalman Filter for 3D Attitude Estimation", University of Minnesota, Department of Computer Science & Engineering, MARS Lab, Mar. 2005, 25 pgs.
Trawny et al., "Vision-Aided Inertial Navigation for Pin-Point Landing using Observations of Mapped Landmarks", Journal of Field Robotics, vol. 24, No. 5, May 2007, pp. 357-378.
Triggs et al., "Bundle Adjustment—A Modern Synthesis", Vision Algorithms: Theory & Practice, Apr. 12, 2002, LNCS 1883, 71 pgs.
Triggs et al., "Bundle Adjustment—A Modern Synthesis", Proceedings of the International Workshop on Vision Algorithms: Theory and Practice, Lecture Notes in Computer Science, Sep. 21-22, 1999, vol. 1883, pp. 298-372.
Weiss et al., "Real-time Metric State Estimation for Modular Vision-inertial Systems", IEEE International Conference on Robotics and Automation, May 9-13, 2011, pp. 4531-4537.
Weiss et al., "Real-time Onboard Visual-Inertial State Estimation and Self-Calibration of MAVs in Unknown Environments", IEEE International Conference on Robotics and Automation, May 14-18, 2012, pp. 957-964.
Weiss et al., "Versatile Distributed Pose Estimation and sensor Self-Calibration for an Autonomous MAV", IEEE International Conference on Robotics and Automations, May 14-18, 2012, pp. 31-38.
Weng et al., "Motion and Structure from Line Correspondences: Closed-Form Solution, Uniqueness, and Optimization", IEEE Transactions on Pattern Analysis and Machine Intelligence, Mar. 1992, vol. 14, No. 3, pp. 318-336.
Williams et al., "Feature and Pose Constrained Visual Aided Inertial Navigation for Computationally Constrained Aerial Vehicles", IEEE International Conference on Robotics and Automation, May 9-13, 2011, pp. 431-438.
Wu et al., "A Square Root Inverse Filter for Efficient Vision-aided Inertial Navigation on Mobile Devices", Proceedings of Robotics: Science and Systems, Jul. 2015, 9 pgs.
Yu, "Model-less Pose Tracking", The Chinese University of Hong Kong, Thesis Submitted for the Degree of Doctor of Philosophy, dated Jul. 2007, 153 pgs.
Yu et al., "Controlling Virtual Cameras Based on a Robust Model-Free Pose Acquisition Technique", IEEE Transactions on Multimedia, No. 1, 2009, pp. 184-190.
Zhou et al., "Determining 3D Relative Transformations for Any Combination of Range and Bearing Measurements", IEEE Transactions on Robotics, Apr. 2013, vol. 29, No. 2, pp. 458-474.

\* cited by examiner

VISION-AIDED INERTIAL NAVIGATION SYSTEM FOR GROUND VEHICLE LOCALIZATION

This application is a continuation of U.S. application Ser. No. 16/425,422 by Stergios et al., entitled "VISION-AIDED INERTIAL NAVIGATION SYSTEM FOR GROUND VEHICLE LOCALIZATION," and filed May 29, 2019, which claims the benefit of U.S. Provisional Application No. 62/677,438 by Stergios et al., entitled "VISION-AIDED INERTIAL NAVIGATION SYSTEM FOR GROUND VEHICLE LOCALIZATION," and filed on May 29, 2018, the entire contents of which are incorporated herein by reference.

GOVERNMENT INTEREST

This invention was made with government support under U.S. Pat. Nos. 1,111,638 and 1,328,722 awarded by National Science Foundation. The government has certain rights in the invention.

TECHNICAL FIELD

This disclosure relates to navigation and, more particularly, to vision-aided inertial navigation.

BACKGROUND

In general, a Vision-aided Inertial Navigation System (VINS) fuses data from a camera and an Inertial Measurement Unit (IMU) to track the six degrees-of-freedom (DOF) position and orientation (pose) of a sensing platform through an environment. In this way, the VINS combines complementary sensing capabilities. For example, an IMU can accurately track dynamic motions over short time durations, while visual data can be used to estimate the pose displacement, up to scale, between consecutive views. For several reasons, VINS has gained popularity to address GPS-denied navigation. During the past decade, VINS have been successfully applied to robots, spacecraft, automotive, and personal localization (e.g., by use of smartphones or laptops), demonstrating real-time performance.

SUMMARY

In general, this disclosure describes techniques for determining constraints to at least one of a position or orientation of a vision-aided inertial navigation system (VINS). In one example, at least one image source produces image data along a trajectory of the VINS within an environment. In some examples, the image data contains a plurality of features observed within the environment at a plurality of poses of the VINS along the trajectory. An inertial measurement unit (IMU) produces IMU data indicative of motion of the VINS. Further, an odometry unit produces odometry data for the IMU, the odometry data indicative of scale information.

In accordance with the techniques of the disclosure, a hardware-based processor computes, based on the image data, the IMU data, and the odometry data, state estimates for at least a position and orientation of the VINS for the plurality of poses of the VINS along the trajectory. In some examples, the processor classifies for each of the poses, each of the features observed at the respective pose into either a first set of the features or a second set of the features. The processor maintains a state vector having states for a position and orientation of the VINS and for positions within the environment for the first set of features for a sliding window of two or more of the most recent poses along the trajectory without maintaining states for positions of the second set of features within the state vector. The processor applies a sliding window filter to compute, based on the second set of features and the odometry data, constraints between the poses within the sliding window. Further, the processor applies the sliding window filter to compute, based on the constraints, the state estimates within the state vector for the sliding window. The processor may use the state estimates to compute at least one of a position or an orientation of the VINS, to compute estimates of a trajectory of the VINS through an environment, or to build a map of the environment surrounding the VINS. For example, the processor uses the odometry data for the VINS to compute scale constraints on estimates of a position of the VINS so as to increase the accuracy of such estimates.

The techniques may provide one or more technical improvements to the computer-related field of vision-aided inertial navigation that are integrated into practical applications. As one example, a VINS as described herein may account for one or more unobservable directions, such as scale, when determining state estimates for a position or an orientation of the VINS. Constant acceleration or zero rotation translations may affect the accuracy of estimates such as scale. By incorporating odometry information into the VINS model to account for scale, the techniques of the disclosure may allow a VINS to achieve significantly higher positioning accuracy over conventional systems. Further, the techniques of the disclosure may allow the VINS to maintain such high accuracy with reduced computational complexity. Thus, a VINS in accordance with the techniques of the disclosure may be able to perform mapping and navigational functions in real-time or on low-resource devices, such as consumer electronics and mobile devices. As another example, incorporating a motion manifold that provides one or more geometric constraints for the trajectory may reduce the localization error. In some cases, this advantage may be achieved, per the techniques herein described, by analyzing the motion profile of the VINS, and its deviation from planar motion (e.g., due to terrain unevenness or vibration of the IMU-camera's mounting platform) and formulating stochastic (i.e., "soft"), instead of deterministic (i.e., "hard") constraints, that allow to properly model the VINS almost-planar motion.

In one example, this disclosure describes a vision-aided inertial navigation system (VINS) comprising: at least one image source configured to produce image data along a trajectory of the VINS within an environment, wherein the image data contains a plurality of features observed within the environment at a plurality of poses of the VINS along the trajectory; an inertial measurement unit (IMU) configured to produce IMU data indicative of motion of the VINS; an odometry unit configured to produce odometry data for the IMU, the odometry data indicative of scale information; and a hardware-based processor communicatively coupled to the image source, the IMU, and the odometry unit, the processor configured to compute, based on the image data, the IMU data, and the odometry data, state estimates for at least a position and orientation of the VINS for the plurality of poses of the VINS along the trajectory, wherein the processor computes the state estimates at least by: classifying, for each pose of the poses, each of the features observed at the pose into either a first set of the features or a second set of the features; maintaining a state vector having states for a position and orientation of the VINS and for positions within the environment for the first set of features for a sliding window of two or more of the most recent poses along the trajectory without maintaining states for positions of the second set of features within the state vector; and applying a sliding window filter to compute, based on the second set of features and the odometry data, constraints between the poses within the sliding window and compute, based on the constraints, the state estimates within the state vector for the sliding window.

In another example, this disclosure describes a method comprising: producing, by at least one image source of a vision-aided inertial navigation system (VINS), image data along a trajectory of the VINS within an environment, wherein the image data contains a plurality of features observed within the environment at a plurality of poses of the VINS along the trajectory; producing, by an inertial measurement unit (IMU) of the VINS, IMU data indicative of motion of the VINS; producing, by an odometry unit of the VINS, odometry data for the IMU, the odometry data indicative of scale information; and computing, by a hardware-based processor communicatively coupled to the image source, the IMU, and the odometry unit and based on the image data, the IMU data, and the odometry data, state estimates for at least a position and orientation of the VINS for the plurality of poses of the VINS along the trajectory, wherein computing the state estimates comprises at least: classifying, for each pose of the poses, each of the features observed at the pose into either a first set of the features or a second set of the features; maintaining a state vector having states for a position and orientation of the VINS and for positions within the environment for the first set of features for a sliding window of two or more of the most recent poses along the trajectory without maintaining states for positions of the second set of features within the state vector; and applying a sliding window filter to compute, based on the second set of features and the odometry data, constraints between the poses within the sliding window and compute, based on the constraints, the state estimates within the state vector for the sliding window.

In another example, this disclosure describes a non-transitory, computer-readable medium comprising instructions that, when executed, are configured to cause a hardware-based processor of a vision-aided inertial navigation system (VINS) to: receive image data along a trajectory of the VINS within an environment, wherein the image data contains a plurality of features observed within the environment at a plurality of poses of the VINS along the trajectory; receive inertial measurement unit (IMU) data indicative of motion of the VINS; receive odometry data for the IMU, the odometry data indicative of scale information; compute, based on the image data, the MU data, and the odometry data, state estimates for at least a position and orientation of the VINS for the plurality of poses of the VINS along the trajectory, wherein computing the state estimates comprises at least: classifying, for each pose of the poses, each of the features observed at the pose into either a first set of the features or a second set of the features; maintaining a state vector having states for a position and orientation of the VINS and for positions within the environment for the first set of features for a sliding window of two or more of the most recent poses along the trajectory without maintaining states for positions of the second set of features within the state vector; and applying a sliding window filter to compute, based on the second set of features and the odometry data, constraints between the poses within the sliding window and compute, based on the constraints, the state estimates within the state vector for the sliding window.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
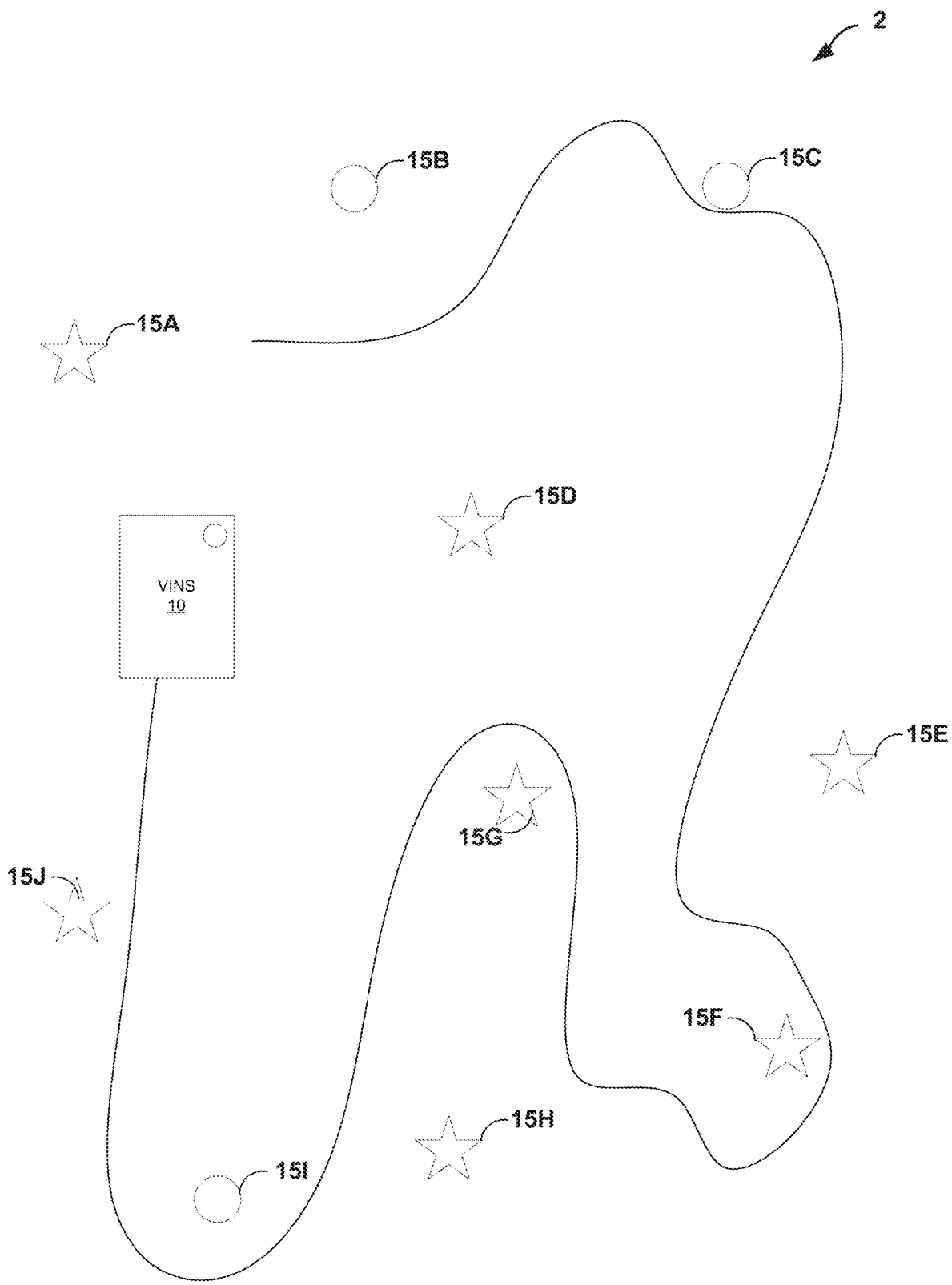
FIG. 1 is a block diagram illustrating a vision-aided inertial navigation system (VINS) that navigates an environment having a plurality of features using one or more image sources and inertial measurement units (IMUs), according to the techniques described herein.

In the absence of GPS, a conventional simultaneous localization and mapping (SLAM) system may use various exteroceptive sensors with 2-dimensional (2D) wheel odometry data to determine, typically, 3 DOF position and orientation. In most cases, however, the underlying planar-motion assumption is only approximately satisfied (e.g., due to the unevenness, or roughness, of the surface, the presence of ramps, bumps, and low-height obstacles on the floor), thus significantly increasing the unmodeled part of the robot's odometry error and leading to low-accuracy estimates or, in the absence of external corrections, even divergence.

A conventional VINS, where visual observations from a camera are combined with data from an IMU to estimate the 6-DOF pose of a platform navigating in 3D, may achieve high-accuracy localization results, even on low-cost mobile devices. However, a conventional VINS may not easily be deployed for localizing robots moving in 2D. Because of the restricted motion (approximately planar and, for the most part, along arcs or straight lines at constant speed or acceleration) that ground robots often undergo when navigating, e.g., indoors, the observability properties of VINS are altered which renders certain, additional, DOF unobservable. Specifically, a VINS has 4 unobservable DOF corresponding to 3 DOF of global translation and 1 DOF of rotation around the gravity vector (e.g., yaw) only when the IMU-camera pair of the VINS undergoes generic 3D motion. In contrast, additional DOF, such as a scale of the VINS, become unobservable when the VINS is restricted to move with constant acceleration. In particular, under the simplifying assumption of perfectly-known gyroscope biases, an initial state of the VINS cannot be uniquely determined for certain motions. In some examples, a VINS may undergo movement for which the VINS may be unable to observe using image data or IMU data alone. For example, such unobservable movement may include translations having constant acceleration, or zero rotation. Such unobservable movement may have the effect of rendering state estimates for position and orientation inaccurate. Further, such unobservable movement may cause error in estimating a scalar magnitude of distance between features observed by the VINS without affecting estimates of relative magnitudes of distance between the features observed by VINS.

In accordance with the techniques of the disclosure, a VINS uses additional information, such as odometry data or a motion manifold, to generate geometric constraints on such unobservable movement. For example, a VINS may use odometry data to generate constraints to scale (e.g., magnitudinal distances between approximated positions of observed features), where conventional systems may be only able to determine relative distances between the approximated positions of observed features. A VINS using the techniques described herein may improve localization accuracy when deployed on wheeled robots. Further, a VINS may use motion manifold information to generate constraints to the position or orientation of the VINS so as to increase an accuracy of estimates of the position or orientation of the VINS, or an accuracy of approximated positions of observed features.

Accordingly, by using the techniques of the disclosure, a VINS may account for unobservable directions when determining state estimates for a position or an orientation of the VINS. For example, by integrating wheel-odometry measurements, the VINS may ensure that scale information is available, even for periods of time where the VINS moves with near-constant acceleration. Furthermore, the use of a manifold to generate a planar-motion constraint in the estimator of the VINS by analyzing the motion profile of the VINS, and its deviation from planar motion, may further reduce the localization error of the VINS. The techniques of the disclosure may allow a VINS to achieve significantly higher positioning accuracy over conventional systems. Further, the techniques of the disclosure may allow the VINS to maintain such high accuracy with reduced computational complexity. Thus, a VINS in accordance with the techniques of the disclosure may be able to perform mapping and navigational functions in real-time or on low-resource devices, such as consumer electronics and mobile devices.

FIG. 1 is a block diagram illustrating a vision-aided inertial navigation system (VINS) 10 that navigates an environment 2 having a plurality of features 15A-15J (hereinafter, "features 15") using one or more image sources and inertial measurement unit (IMUs). That is, VINS 10 is one example of a device that utilizes a 3-dimensional (3D) map of environment 2 to determine the position and orientation of VINS 10 as the VINS traverses the environment, where the map may be constructed in real-time by the VINS or previously constructed.

Environment 2 may, for example, represent an environment where conventional GPS-signals are unavailable for navigation, such as on the moon or a different planet or even underwater.

As additional examples, environment 2 may represent an indoors environment such as the interior of a building, such as a convention center, shopping mall, sporting arena, business office and the like. Features 15, also referred to as landmarks, represent objects visible within environment 2, such as rocks, trees, signs, walls, stairs, chairs, tables, and the like. Features 15 may be moving or stationary objects within environment 2.

VINS 10 represents any mobile device that implements the techniques described herein. VINS 10 may be, for example, a robot, mobile sensing platform, a mobile phone, a laptop, a tablet computer, a vehicle, such as an automobile, ship, unmanned aerial vehicle, or drone, a wearable device such as smart glasses and the like. The increasing range of sensing capabilities offered by modern mobile devices, such as cell phones and tables, as well as their increasing computational resources make them ideal for applying VINS. In some implementations, the techniques described herein may be used within environments having GPS or similar signals and may provide supplemental localization and mapping information.

As one example, VINS 10 may be an autonomous robot although, as discussed above, VINS 10 may take the form of other devices that implement the techniques described herein. While traversing environment 2, the image sources of VINS 10 produce image data at discrete time instances along the trajectory within the three-dimensional (3D) environment, where the image data captures features 15 within the 3D environment at each of the time instances. In addition, IMUs of VINS 10 produces IMU data indicative of a dynamic motion of VINS 10.

As described in detail herein, VINS 10 includes a hardware-based computing platform that implements an estimator that fuses the image data and the IMU data to perform localization of VINS 10 within environment 2. In general, the estimator processes image data 14 and IMU data 18 to estimate the 3D IMU pose and velocity together with the time-varying IMU biases, camera rolling shutter and IMU-camera time synchronization and to produce, based on the captured image data, estimates for poses of VINS 10 along the trajectory and, in some cases, a position and orientation within an overall map of the environment. In some examples, the map includes positions of features that VINS 10 has observed in the environment. Utilizing these techniques, VINS 10 may navigate environment 2 and, in some cases, may construct or augment the mapping information for the environment including the positions of features 15. In one example, the map may be constructed using cooperative mapping techniques described in U.S. patent application Ser. No. 15/605,448, to Roumeliotis et al., filed May 25, 2017 and entitled "RESOURCE-AWARE LARGE-SCALE COOPERATIVE 3D MAPPING USING MULTIPLE MOBILE DEVICES," which issued as U.S. Pat. No. 10,203,209 on Nov. 30, 2017, the entire contents of which are incorporated herein by reference.

The estimator of VINS 10 may operate according to different types of estimators. For example, in an example implementation, VINS 10 implements a sliding window filter. In some examples, the sliding window filter is a Multi-state Constraint Kalman Filter (MSCKF) as described in U.S. Pat. No. 9,243,916, the entire contents of which are incorporated herein. In other examples, the sliding window filter is an inverse, sliding-window filter (ISWF) as described in U.S. patent application Ser. No. 14/796,574, filed Jul. 10, 2015, entitled "INVERSE SLIDING-WINDOW FILTERS FOR VISION-AIDED INERTIAL NAVIGATION SYSTEMS," the entire contents of which is incorporated herein by reference. In other examples, the sliding window filter is a sliding-window Iterative Kalman Smoother (IKS) as described U.S. patent application Ser. No. 15/130,736, filed Apr. 15, 2016, entitled "ITERATIVE KALMAN SMOOTHER FOR ROBUST 3D LOCALIZA- TION FOR VISION-AIDED INERTIAL NAVIGATION," the entire contents of which are incorporated herein by reference.

In one example, as described herein, the estimator implements a sliding window filter for localization within environment 2. In one example implementation, the sliding window filter is an MSCKF filter. Therefore, VINS 10 may efficiently compute, based on the state estimates for the position and orientation of the frame of reference for each of the plurality of poses along the trajectory, a map of approximate positions of the features observed along the trajectory. Accordingly, VINS 10 may be suitable for large-scale SLAM problems to obtain efficient approximate mapping solutions. Further, VINS 10 may be suitable for SLAM operations on resource-constrained devices such as mobile devices or for real-time mapping and navigation.

Figure 2:
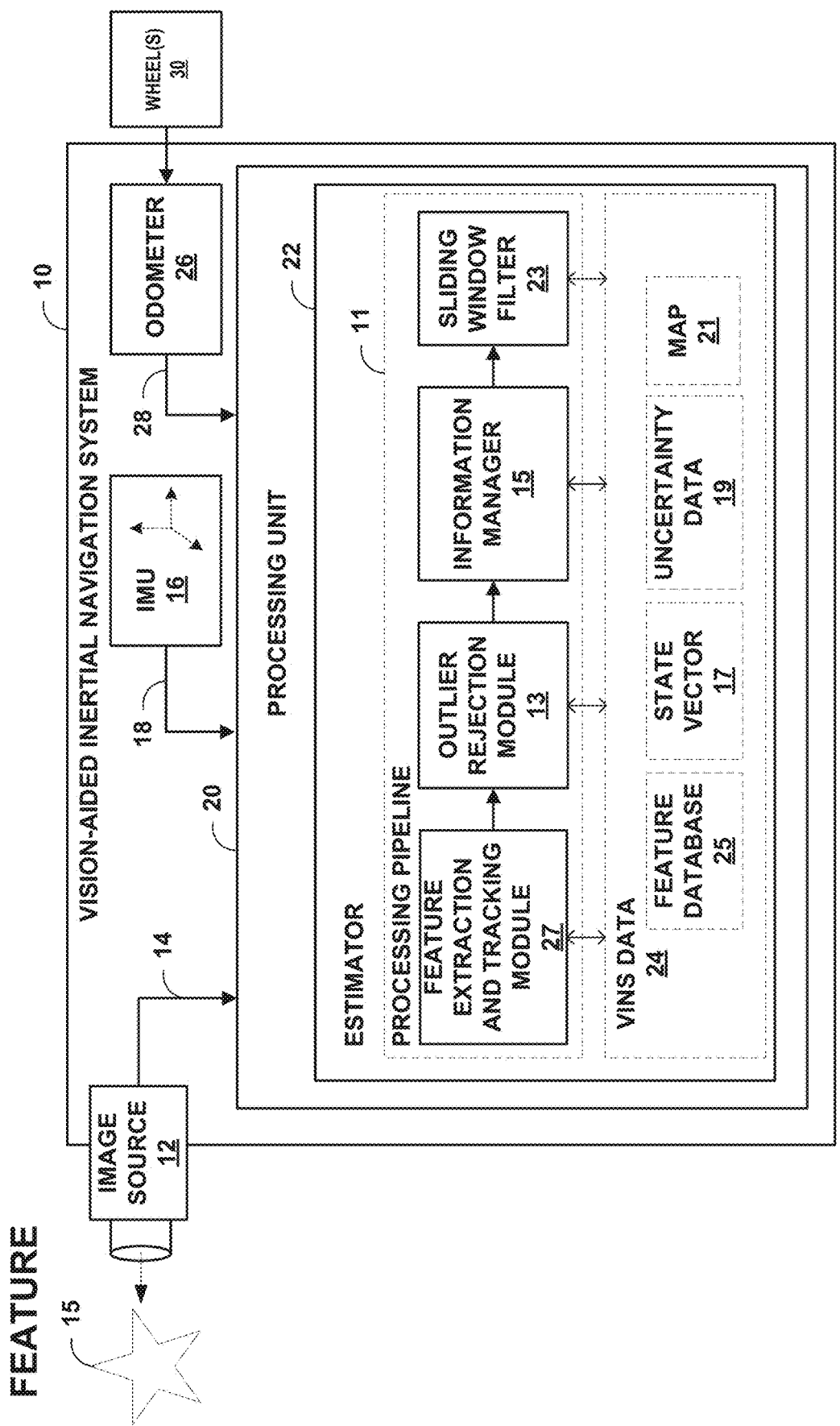
FIG. 2 is a block diagram illustrating an example implementation of the VINS of FIG. 1 in further detail.

FIG. 2 is a block diagram illustrating an example implementation of VINS 10 in further detail. Image source 12 of VINS 10 images an environment in which VINS 10 operates so as to produce image data 14. That is, image source 12 generates image data 14 that captures a number of features visible in the environment. Image source 12 may be, for example, one or more cameras that capture 2D or 3D images, a laser scanner or other optical device that produces a stream of 1D image data, a depth sensor that produces image data indicative of ranges for features within the environment, a stereo vision system or a vision system having multiple cameras to produce 3D information, a Doppler radar, an ultrasound imager, a red-green-blue-depth (RGB-D) imager, and the like. In this way, image data 14 provides exteroceptive information as to the external environment in which VINS 10 operates. Moreover, image source 12 may capture and produce image data 14 at time intervals in accordance one or more clocks associated with the image source. In other words, image source 12 may produce image data 14 at each of a first set of time instances along a trajectory within the three-dimensional (3D) environment, wherein the image data captures one or more features 15 within the 3D environment at each of the first time instances. Feature 15 of FIG. 2 can, for example, be one or more of any of features 15A-15J of FIG. 1.

IMU 16 produces IMU data 18 indicative of a dynamic motion of VINS 10. IMU 16 may, for example, detect a current acceleration using one or more accelerometers as VINS 10 is translated, and detect the rotational velocity (i.e., the rate of change in rotational attributes like pitch, roll and yaw) using one or more gyroscopes as VINS 10 is rotated. IMU 14 produces IMU data 18 to specify the detected motion. In this way, IMU data 18 provides proprioceptive information as to the VINS 10 own perception of its movement and orientation within the environment. Moreover, IMU 16 may produce IMU data 18 at time intervals in accordance a clock associated with the IMU. In this way, IMU 16 produces IMU data 18 for VINS 10 along the trajectory at a second set of time instances, wherein the IMU data indicates a motion of the VINS along the trajectory. In many cases, IMU 16 may produce IMU data 18 at much faster time intervals than the time intervals at which image source 12 produces image data 14. Moreover, in some cases the time instances for image source 12 and IMU 16 may not be precisely aligned such that a time offset exists between the measurements produced, and such time offset may vary over time. In such cases, VINS 10 may compensate and correct for any misalignment by applying the techniques described in U.S. patent Ser. No. 14/733,468, entitled "EFFICIENT VISION-AIDED INERTIAL NAVIGATION USING A ROLLING-SHUTTER CAMERA WITH INACCURATE TIMESTAMPS," incorporated herein by reference in its entirety.

Odometer 26 produces odometry data 28 indicative of scale information. For example, VINS 10 may include one or more wheels 30. Odometer 26 may monitor wheel encoder data of wheels 30 to generate odometry data 28. Such wheel encoder data may indicate an angular rotation of wheels 30. Given a diameter of wheels 30 and a magnitude of the angular rotation of wheels 30, odometer 26 may calculate a distance traveled by VINS 10.

In general, estimator 22 fuses image data 14, IMU data 18, and odometry data 28 to determine a position and orientation of VINS 10 as well as positions of features 15 as the VINS traverses environment 2. That is, estimator 22 of processing unit 20 process image data 14, IMU data 18, and odometry data 28 to compute state estimates for the various degrees of freedom of VINS 10 and, from the state estimates, computes position, orientation, speed, locations of observable features, a map to be used for localization, an odometry or other higher order derivative information represented by VINS data 24. Processing unit 20 may, for example, comprise a hardware-based computing platform having one or more processors that execute software instructions and/or application-specific hardware for implementing the techniques described herein.

In the example of FIG. 2, estimator 22 comprises a processing pipeline 11 for measurements from image source 12, IMU 16, and odometer 26. In this example, processing pipeline 11 includes feature extraction and tracking module 27, outlier rejection module 13, information manager 15 and filter 23.

Feature extraction and tracking module 27 extracts features 15 from image data 14 acquired by image source 12 and stores information describing the features in feature database 25. Feature extraction and tracking module 27 may, for example, perform corner and edge detection to identify features and track features 15 across images using, for example, the Kanade-Lucas-Tomasi (KLT) techniques described in Bruce D. Lucas and Takeo Kanade, *An iterative image registration technique with an application to stereo vision*, In Proc. of the International Joint Conference on Artificial Intelligence, pages 674-679, Vancouver, British Columbia, Aug. 24-28, 1981, the entire content of which in incorporated herein by reference.

Outlier rejection module 13 provides robust outlier rejection of measurements from image source 12 and IMU 16. For example, outlier rejection module may apply a Mahalanobis distance tests to the feature measurements to identify and reject outliers. As one example, outlier rejection module 13 may apply a 2-Point Random sample consensus (RANSAC) technique described in Laurent Kneip, Margarita Chli, and Roland Siegwart, *Robust Real-Time Visual Odometry with a Single Camera and an Imu*, In Proc. of the British Machine Vision Conference, pages 16.1-16.11, Dundee, Scotland, August 29-Sep. 2, 2011, the entire content of which in incorporated herein by reference.

Information manager 15 selects features from feature database 15 and feeds measurements for the selected features to filter 23, which may perform simultaneous localization of the position and orientation for VINS 10 within environment 2 by iteratively optimizing over measurements throughout trajectory, which can be computationally extensive. As described herein, estimator 22 implements filter 23 that iteratively updates predicted state estimates over a bounded size sliding window of state estimates for poses of VINS 10 and positions of features 15 in real-time as new image data 14 and IMU data 18 are obtained. That is, by implementing the sliding window approach, estimator 22 of VINS 10 marginalizes out past state estimates and measurements through the sliding window so as to perform simultaneous localization of the position and orientation for VINS 10 as VINS 10 traverses environment 2 for SLAM operations.

In one example implementation, filter 23 of estimator 22 recursively operates on the streams of image data 14 and IMU data 18 to compute a sliding window of predicted estimates for the state variables maintained within state vector 17 along with uncertainty data 19 representing the respective uncertainties in the form of one or more uncertainty matrices, which may take the form of one or more Hessian matrices.

Estimator 22 may implement filter 23 such that uncertainty data 19 takes the form of a Hessian matrix that contains estimates of the uncertainty of each predicted state estimate in state vector 17 as well as a correlation between uncertainties. When a subsequent measurement is observed from either image data 14 or IMU data 18, filter 23 updates the sliding window of predicted state estimates with state vector 17 and the uncertainty data 19. In general, estimator 22 operates in real-time using the present input measurements of image data 14 and IMU data 18 and the previously calculated state estimates and its uncertainty matrix. In general, when new image data 14, IMU data 18, or odometry data 28 is received, filter 23 projects the measurements as the data arrives onto the state estimates within state vector 17 to re-compute the predicted states and to update respective uncertainty data 19 for each state estimate. Any difference between the predicted state estimates as computed by estimator 22 and the actual feature measurements is referred to as a residual.

In some examples, estimator 22 iteratively processes measurements from image data 14 and IMU data 18 to update estimates only for keyframes (key robot/device poses) and key landmarks while also exploiting information (e.g., visual observations, inertial measurements, and odometry measurements) available to the non-keyframes along the trajectory. In such example implementations, filter 23 projects new measurements onto the keyframes, by generating consistent pose (position and orientation) constraints between keyframes. As used herein, the term keyframes refers to the individual poses of the VINS 10 for which position and orientation of the VINS are to be estimated. In contrast, the term non-keyframes refers to intermediate poses between keyframes and for which, in some examples, complete state estimates of the VINS are not computed. In these example implementations, information from non-keyframes, acquired between keyframes, is not discarded. Instead, this information is projected on to estimates in the state vector associated with the keyframes, in order to generate tight constraints between the keyframes. For example, information from a non-keyframe may be projected onto a preceding keyframe to compute relative position, orientation, and scalar distance constraints between the preceding keyframe and the non-keyframe. Further examples of such implementations are described in U.S. patent application Ser. No. 14/271,971, entitled "CONSTRAINED KEY FRAME LOCALIZATION AND MAPPING FOR VISION-AIDED INERTIAL NAVIGATION," filed May 7, 2014, the entire contents of which are incorporated herein by reference.

Estimator 22 processes inertial, visual, and odometric measurements to compute, based on the image data and the IMU data, state estimates for at least a position and orientation of VINS 10 for a plurality of poses of the VINS along the trajectory. That is, estimator 22 process image data 14, IMU data 18, and odometry data 28 to update within state vector 17 estimates for the 3D IMU pose and velocity together with the time-varying IMU biases so as to determining the position and orientation of estimator 22 within the environment represented by map 21, where the map may be initially constructed using the cooperative mapping information described herein. Estimator 22 may, in accordance with the techniques described herein, apply estimation techniques that compute state estimates for 3D poses of IMU 16 at each of the first set of time instances associated with capture of the IMU data and 3D poses of image source 12 at each of the second set of time instances associated with capture of the image data along the trajectory.

In this example implementation, VINS 10 provides three sources of information: motion information (IMU data 18) from an IMU 14, image data 14 (e.g., feature observations) from image source 12, and odometric information (odometry data 28) from odometer 26. Estimator 22 may classify the features observations into two main categories: SLAM features for which estimates are included and updated within a complex system state vector 17 maintained by estimator 22, and multi-state constraint Kalman filter (MSCKF) features for which the estimator has determined to exclude corresponding estimates in the state vector but instead used the features to generate constraints that geometrically constrain the states for the poses of VINS 10 from which the MSCKF feature was observed. That is, rather than maintain state estimates for positions of each observed feature 15 within its internal state vector, the estimator may group the images per feature and elect to exclude state estimates for one or more of those features (i.e., MSCKF features) from its state vector that were observed from multiple poses along the trajectory. For these features excluded from the state vector, referred to as MSCKF features, estimator 22 computes geometric constraints that constrain state estimates for other poses within the sliding window state vector and that are used to compute state updates for those state estimates within the state vector. In this way, MSCKF features relate and constrain estimated poses within the sliding window as VINS 10 moves along a trajectory. They require less computations than SLAM features because their feature states are not directly estimated. Further example details of an estimator that computes constraints for features 15 observed from multiple poses and utilizes constraints to compute the state estimates for VINS 10 while excluding the MSCKF features from the state vector are described in U.S. patent application Ser. No. 12/383,371, entitled "VISION-AIDED INERTIAL NAVIGATION," the entire contents of which are incorporated herein by reference.

In one example, as described herein, the estimator implements a sliding window filter for localization within environment 2. The estimator may, for example, exclude from the state vector state information representing estimates for positions within the environment for the features that were each observed from the multiple poses and for which the one or more constraints were computed. Moreover, the Hessian matrix of uncertainty data excludes data for the features that were each observed from the multiple poses and for which the one or more constraints were computed.

For example, estimator 22 of VINS 10 estimates the following state vector:

$$x = \begin{bmatrix} ^I q_G^T & b_g^T & ^G v_I^T & b_a^T & ^G p_I^T & | & ^G f_1^T & \ldots & ^G f_N^T \end{bmatrix}^T \quad (1)$$

where $^I q_G$ is the unit quaternion that represents the orientation of the global frame G in the IMU frame {I} of IMU 16 at time t. $G_{V_I}$ and $G_{p_I}$ are the velocity and position of {I} and {G}, respectively, and gyroscope and accelerometer biases are denoted by $b_g$ and $b_a$, respectively. The positions of point features in {G} are denoted by $G_{f_j}$, j=1, . . . , N.

IMU 16 provides measurements of the rotational velocity, $\omega_m$, and the linear acceleration, $a_m$, as:

$$\omega_m(t) = {}^I\omega(t) + b_g(t) + n_g(t) \quad (2)$$
$$a_m(t) = C({}^I q_G(t))({}^G a(t) - {}^G g) + b_a(t) + n_a(t)$$

where the noise terms, $n_g(t)$ and $n_a(t)$ are modelled as zero-mean, white Gaussian noise processes, $C(I_{q_G}(t))$ denotes the rotational matrix associated with the quaternion $I_{q_G}$ at time t, while the gravitational acceleration, $G_g$, is considered a known constant. The rotational velocity of IMU 16 is $I_\omega(t)$ and the linear acceleration of IMU 16 is $G_a(t)$ which can be used to derive the continuous-time system equations:

$$^I\dot{q}_G(t) = \frac{1}{2}\Omega(\omega_m(t) - b_g(t) - n_g(t))^I q_G(t) \quad (3)$$
$$\dot{b}_g(t) = n_{wg}(t)$$
$$^G\dot{v}_I(t) = C({}^I q_G(t))^T(a_m(t) - b_a(t) - n_a(t)) + {}^G g$$
$$\dot{b}_a(t) = n_{wa}(t)$$
$$^G\dot{p}_I(t) = {}^G v_I(t)$$
$$^G\dot{f}_j(t) = 0, j = 1, \ldots, N$$
$$\text{where, } \Omega(\omega) \triangleq \begin{bmatrix} -\lfloor\omega\rfloor & \omega \\ -\omega^T & 0 \end{bmatrix}$$

for $\omega \in \mathbb{R}^3$, $\lfloor \cdot \rfloor$ denotes the skew-symmetric matrix, while the biases of IMU 16 are modelled as random walks driven by white, zero-mean Gaussian noise processes $n_{wg}(t)$ and $n_{wa}(t)$, respectively.

As image source 12 and IMU 16 moves, image source 12 provides measurements of point features extracted from the images. Each such measurement, $z_j$, is modeled as the perspective projection of the point feature $f_j$, expressed in the current IMU frame {I}, onto the image plane:

$$z_j = \frac{1}{z}\begin{bmatrix} x \\ y \end{bmatrix} + n_j, \begin{bmatrix} x \\ y \\ z \end{bmatrix} \triangleq {}^I f_j = C({}^I q_G)({}^G f_j - {}^G p_I) \quad (4)$$

where the measurement noise, $n_j$, is modeled as zero mean, white Gaussian.

As a result of the estimation, estimator 22 performs localization so as to track the position and orientation of the device (frame of reference) within the environment. VINS 10 may output on a display information based on the estimation, such as information related to one or more estimated positions and/or orientations of VINS 10, a determined trajectory as superimposed on a 2D or 3D graph of the environment or regions thereof, information associated with navigation instructions for a user associated with VINS 10, directional commands based on input specifying one or more desired locations, information specifying an estimated time of arrival, distance traveled, or distance remaining, and the like. For example, such information may be output textually and/or graphically to a display associated with VINS 10, communicated to other display devices, or communicated to remote computing devices.

Observability is a fundamental property of a dynamic system and provides important insights. For generic motions, VINS 10 has four unobservable directions (three for global translation and one for global yaw). Where VINS 10 is incorporated into a ground vehicle, the motion may be constrained to be of either constant local acceleration or no rotation. In the case where VINS 10 is deployed on a ground vehicle, the motion of VINS 10 is approximately planar, and, for the most part, along a straight line (e.g., when moving forward) or a circular arc (e.g., when turning). Such straight motion or turning motion may impact the observability properties of VINS 10, and thus the accuracy of the corresponding estimator.

Consider that VINS 10 moves with constant local linear acceleration (e.g., on a circle), e.g., $$^I a(t) \triangleq C({}^I q_G(t))^G a(t) \equiv {}^I a, \forall t \geq t_0 \quad (5)$$

where $I_a$ is a constant vector with respect to time.

Accordingly, the linearized model of VINS 10 ((3)-(4) above) has the following additional unobservable direction, besides the global translation and yaw, if and only if the condition in (5) is satisfied:

$$N_8 = \begin{bmatrix} 0_{3\times1} \\ 0_{3\times1} \\ {}^G v_{I_0} \\ -{}^I a \\ {}^G p_{I_0} \\ {}^G f_1 \\ \vdots \\ {}^G f_N \end{bmatrix} \quad (6)$$

The unobservable direction in (6) corresponds to the scale, as shown below.

The scale of VINS 10 is an unobservable direction of the VINS model, if and only if the platform is moving with constant local linear acceleration. In some examples, the techniques of the disclosure examines the right null space of the observability matrix of the corresponding linearized VINS model. For clarity of presentation, the example below is described with only one feature in the state vector. However, the example below may be easily extended to multiple features.

Any block row, $M_k$, of the observability matrix has the following structure:

$$M_k = H_k \Phi_{k,1} = \Gamma_1 [\Gamma_2 \quad \Gamma_3 \quad -\delta t_k I_3 \quad \Gamma_4 \quad -I_3 \quad I_3] \quad (7)$$

for any time $t_k \geq t_0$, with the matrices $\Gamma_i$, i=1, . . . , 4. From the property of the observability matrix, the scale direction, $N_s$, is unobservable, if and only if, $M_k N_s = 0$. From equations (6) and (7) above, together with the definition of the matrices $\Gamma_i$, the following relationships are obtained:

$$M_k N_s = \Gamma_1(-^G v_{I_0} \delta t_k - \Gamma_4{}^I a - ^G p_{I_0} + ^G f) \quad (8)$$

$$\text{with } \Gamma_4{}^I a = \int_{t_0}^{t_k} \int_{t_0}^{s} {}_{I_\tau}^G C d\tau ds \cdot {}^I a \quad (9)$$

$$= \int_{t_0}^{t_k} \int_{t_0}^{s} {}_{I_\tau}^G C^I a d\tau ds \quad (10)$$

$$= \int_{t_0}^{t_k} \int_{t_0}^{s} {}_{I_\tau}^G C^{I_\tau} a(\tau) d\tau ds \quad (11)$$

$$= \int_{t_0}^{t_k} \int_{t_k}^{s} {}^G a(\tau) d\tau ds \quad (12)$$

$$= \int_{t_0}^{t_k} \left( {}^G v_{I_s} - {}^G v_{I_0} \right) ds \quad (13)$$

$$= {}^G p_{I_k} - {}^G p_{I_0} - {}^G v_{I_0} \delta t_k \quad (14)$$

where the equality from (10) to (11) holds if and only if the constant acceleration assumption in (5) is satisfied. Substituting (14) into (8) yields:

$$M_k N_s = \Gamma_1({}^G f - {}^G p_{I_k}) = H_{c,k} {}_G^{I_k} C({}^G f - {}^G p_{I_k}) = H_{c,k}{}^{I_k} f = 0 \quad (15)$$

where the last equality holds because image source 12 perspective-projection Jacobian matrix, $H_{c,k}$, has as its right null space the feature position in the IMU frame. Lastly, this new unobservable direction is in addition to the four directions corresponding to global translation and yaw, e.g., $N_s$ and $N_1$ are independent, because the 4th block element of $N_1$ is zero while that of $N_s$ is not.

The unobservable direction in (6) corresponds to the scale. Assume that there exists a state vector x for VINS 10 and the corresponding measurements from IMU 16 and image source 12. Consider the case where both the entire trajectory of the platform and the scene are "scaled up" by a factor of $\alpha$, or equivalently, the global coordinate system {G} is "shrunken down" by the factor $\alpha$. This corresponds to a change of the original state x into a new state x'. Specifically, as for the of IMU 16, $p_I$, and the feature's position, $f_j$, with respect to {G}, the scale change can be written as:

$$^G p_I' = \alpha {}^G p_I \quad (16)$$

$$^G a_I' = \alpha {}^G a_I \quad (17)$$

where $G_{p_I'}$ and $G_{f_j'}$ are the new positions after the scaling. By taking the first and second-order time derivative on both sides of (16), the scaled velocity and body acceleration of IMU 16 is defined as:

$$^G v_I' = \alpha {}^G v_I \quad (18)$$

$$^G a_I' = \alpha {}^G a_I \quad (19)$$

Note that, on the other hand, the scale change does not affect the orientation IMU 16 with respect to the global frame (as the "scale" referred here is with respect to translation only), e.g.:

$$_G^I C' = _G^I C \quad (20)$$

and hence the rotational velocity remains the same as well:

$$^I \omega' = ^I \omega' \quad (21)$$

Moreover, to ensure that this scale change is unobservable, the measurements from IMU 16 and image source 12 need to be unchanged. As for image source 12 observations, for each feature j, from (4), (16), (17), (20), the following relationships are described:

$$\begin{bmatrix} x' \\ y' \\ z' \end{bmatrix} \triangleq {}^I f_j' = \quad (22)$$

$$_G^I C'({}^G f_j' - {}^G p_I') = {}_G^I C(\alpha {}^G f_j - \alpha {}^G p_I) = \alpha {}_G^I C({}^G f_j - {}^G p_I) = \alpha {}^I f_j = \alpha \begin{bmatrix} x \\ y \\ z \end{bmatrix}$$

$$\Rightarrow z_j' = \frac{1}{z'} \begin{bmatrix} x' \\ y' \end{bmatrix} = \frac{1}{\alpha z} \begin{bmatrix} \alpha x \\ \alpha y \end{bmatrix} = \frac{1}{z} \begin{bmatrix} x \\ y \end{bmatrix} = z_j \quad (23)$$

Hence, after scaling, image source 12 measurements do not change due to the perspective projection model. This result is to be expected, because a camera's observation is scale invariant, therefore it's insensitive to any scale change. As for IMU 16 measurements, the rotational velocity measured by the gyroscope is described first. Because the gyroscope measurements need to stay the same before and after the scaling, e.g.:

$$\omega_m = {}^I\omega + b_g = {}^I\omega' + b_g' \quad (24)$$

by substituting (21), the following relationship is obtained:

$$b_g' = b_g \quad (25)$$

Similarly, for the linear acceleration measurements from the accelerometer, from (2), (19), and (20), the following relationship is obtained:

$$a_m = {}_G^I C({}^G a_I - {}^G g) + b_a = {}_G^I C'({}^G a_I' - {}^G g) + b_a' = {}_G^I C(\alpha {}^G a_I - {}^G g) + b_a' \quad (26)$$

$$\Rightarrow b_a' = b_a - (\alpha - 1){}_G^I C^G a_I = b_a - (\alpha - 1){}^I a \quad (27)$$

Collecting the equations (16), (17), (18), (20), (25), and (27), the state element changes of VINS 10 due to the scaling, by a factor of $\alpha$, is:

$$_G^I C' = _G^I C \quad (28)$$

$$b_g' = b_g$$

$$^G v_I' = \alpha {}^G v_I = {}^G v_I + (\alpha - 1){}^G v_I$$

$$b_a' = b_a - (\alpha - 1){}^I a$$

-continued
$$^G p'_I = \alpha^G p_I = {}^G p_I + (\alpha - 1)^G p_I$$

$$^G f'_j = \alpha^G f_j = {}^G f_j + (\alpha - 1)^G f_j, j = 1, \ldots, N$$

If the original and the new error state are defined as $\tilde{x}$ and $\tilde{x}'$, which correspond to the original and the new VINS state x and x', respectively, then (28) can be rewritten in the error-state form as:

$$\begin{bmatrix} {}^I \delta \theta'_G \\ \tilde{b}'_g \\ {}^G \tilde{v}'_I \\ \tilde{b}'_a \\ {}^G \tilde{p}'_I \\ {}^G \tilde{f}'_1 \\ \vdots \\ {}^G \tilde{f}'_N \end{bmatrix} = \begin{bmatrix} {}^I \delta \theta_G \\ \tilde{b}_g \\ {}^G \tilde{v}_I + (\alpha - 1)^G v_I \\ \tilde{b}_a - (\alpha - 1)^I a \\ {}^G \tilde{p}_I + (\alpha - 1)^G p_I \\ {}^G \tilde{f}_1 + (\alpha - 1)^G f_1 \\ \vdots \\ {}^G \tilde{f}_N + (\alpha - 1)^G f_N \end{bmatrix} = \begin{bmatrix} {}^I \delta \theta_G \\ \tilde{b}_g \\ {}^G \tilde{v}_I \\ \tilde{b}_a \\ {}^G \tilde{p}_I \\ {}^G \tilde{f}_1 \\ \vdots \\ {}^G \tilde{f}_N \end{bmatrix} + (\alpha - 1) \begin{bmatrix} 0_{3 \times 1} \\ 0_{3 \times 1} \\ {}^G v_I \\ -{}^I a \\ {}^G p_I \\ {}^G f_1 \\ \vdots \\ {}^G f_N \end{bmatrix} \quad (29)$$

Note that the right-most vector is the same as in (6), hence:

$$\tilde{x}' = \tilde{x} + (\alpha - 1) N_s \quad (30)$$

To summarize, if the entire trajectory of the platform and the scene are scaled by a factor of $\alpha$ (as the starting point of this analysis), then error state of VINS 10 (and hence the state) is changed along the direction of $N_s$ by a factor of $\alpha - 1$, without changing the measurements from image source 12 or IMU 16. Moreover, the reverse statement holds true as well. Therefore, the direction $N_s$ in (6) is unobservable and corresponds to the scale change in terms of its physical meaning. With respect to equation (6), when the local acceleration is non-varying, one cannot distinguish the magnitude of the true body acceleration from that of the accelerometer bias, as both of them are, at least temporarily, constant. As a consequence, the magnitude of the true body acceleration can be arbitrary, leading to scale ambiguity. This is applicable to a planar ground vehicle that moves with (almost) constant acceleration, such as when following a straight line path with constant speed or acceleration, or when making turns along a circular arc with constant speed, etc. These motions may cause inaccuracy in the scale estimated by a VINS.

As another example of unobservable direction, consider a situation where VINS 10 has no rotational motion, e.g., the orientation of VINS 10 remains the same across time:

$$^{I_t}_G C \triangleq C({}^I q_G(t)) \equiv {}^{I_0}_G C, \forall t \geq t_0 \quad (31)$$

where $I_t$ denotes the IMU frame at time t. The linearized VINS model of (3)-(4) has the following additional unobservable directions, besides the global translation, if and only if the condition in (31) is satisfied:

$$N_o = \begin{bmatrix} {}^{I_0}_G C \\ 0_{3 \times 3} \\ -\lfloor {}^G v_{I_0} \rfloor \\ {}^{I_0}_G C \lfloor {}^G g \rfloor \\ -\lfloor {}^G p_{I_0} \rfloor \\ -\lfloor {}^G f_1 \rfloor \\ \vdots \\ -\lfloor {}^G f_N \rfloor \end{bmatrix} \quad (32)$$

The unobservable directions in (32) correspond to all 3 DOF of global orientation, instead of only yaw. As proof, the relationship $M_k N_o = 0$ is presented below. From (32) and (9), together with the definition of the matrices $\Gamma_i$, i=1, ..., 4, the following relationships are obtained:

$$M_k N_o = \Gamma_1 \left( \Gamma_4 {}^{I_0}_G C - \frac{1}{2} \delta t_k^2 I_3 \right) \lfloor {}^G g \rfloor \quad (33)$$

$$= \Gamma_1 \left( \int_{t_0}^{t_k} \int_{t_0}^{s} {}^G_{I_\tau} C d\tau ds \cdot {}^{I_0}_G C - \frac{1}{2} \delta t_k^2 I_3 \right) \lfloor {}^G g \rfloor \quad (34)$$

$$= \Gamma_1 \left( \int_{t_0}^{t_k} \int_{t_0}^{s} {}^G_{I_0} C d\tau ds \cdot {}^{I_0}_G C - \frac{1}{2} \delta t_k^2 I_3 \right) \lfloor {}^G g \rfloor \quad (35)$$

$$= \Gamma_1 \left( \int_{t_0}^{t_k} \int_{t_0}^{s} 1 d\tau ds \cdot {}^G_{I_0} C {}^{I_0}_G C - \frac{1}{2} \delta t_k^2 I_3 \right) \lfloor {}^G g \rfloor \quad (36)$$

$$= \Gamma_1 \left( \frac{1}{2} \delta t_k^2 I_3 - \frac{1}{2} \delta t_k^2 I_3 \right) \lfloor {}^G g \rfloor = 0 \quad (37)$$

where the equality from (34) to (35) holds if and only if the no rotation (e.g., constant orientation) assumption in (31) is satisfied.

Lastly, these new unobservable directions are in addition to the three directions corresponding to global translation, e.g., $N_o$ and $N_{t,1}$ are independent, because the first block element of $N_{t,1}$ is zero while that of $N_o$ is a (full-rank) rotational matrix.

The unobservable directions in (32) correspond to the 3-DOF global orientation. Assume that there exists a VINS state vector x and the corresponding measurements from IMU 16 and image source 12. Consider the case where the global frame {G} is rotated by a small angle $\delta \phi$ into a new global frame {G'}, where $\delta \phi$ is a 3×1 vector whose direction and magnitude represent the axis and angle of the rotation, respectively. Hence, $$^G_{G'} C = C(\delta \phi) \simeq I_3 - \lfloor \delta \phi \rfloor \quad (37)$$

by the small-angle approximation of the rotational matrix based on the assumption that the amount of rotation is small. Due to this change of the global frame (from {G} to {G'}), the original VINS state, x, which is expressed with respect to {G}, is now changed to a new state, x', which is expressed with respect to {G'}. Specifically, as for the orientation of IMU 16:

$$^I_{G'} C = {}^I_G C {}^G_{G'} C = {}^I_G C (I_3 - \lfloor \delta \phi \rfloor) = (I_3 - \lfloor {}^I_G C \delta \phi \rfloor) {}^I_G C \quad (38)$$

Because the transformation involves only rotation, the new position state of IMU 16 can be obtained as:

$$^{G'}p_I = {}^{G'}_G C{}^G p_I = {}^G_{G'} C^T {}^G p_I = \tag{39}$$
$$(I_3 - \lfloor \delta\phi \rfloor)^{TG} p_I = (I_3 + \lfloor \delta\phi \rfloor)^G p_I = {}^G p_I + \lfloor \delta\phi \rfloor^G p_I = {}^G p_I - \lfloor {}^G p_I \rfloor \delta\phi$$

and similarly for the feature's position:

$$^{G'}f_j = {}^{G'}_G C {}^G f_j = {}^G f_j - \lfloor {}^G f_j \rfloor \delta\phi, \, j = 1, \ldots, N \tag{40}$$

By taking the first-order time derivative on both sides of (39), the new velocity state of IMU 16 is:

$$^{G'}v_I = {}^G v_I - \lfloor {}^G v_I \rfloor \delta\phi \tag{41}$$

Note that, on the other hand, the transformation of the global frame does not affect the trajectory, and hence the motion, of IMU 16 when expressed in the local frame of IMU 16 of reference {I}. Therefore, the local rotational velocity and linear acceleration of IMU 16 are the same before and after the transformation of the global frame. e.g.:

$$^I\omega' = {}^I\omega \tag{42}$$
$$^Ia' = {}^Ia \tag{43}$$

Moreover, to ensure that the change of the global frame's orientation is unobservable, the measurements from IMU 16 and image source 12 need to be unchanged. As for image source 12 observations for each feature j, from (4), (38), (39), and (40):

$$\begin{bmatrix} x' \\ y' \\ z' \end{bmatrix} \triangleq {}^I f'_j = {}^I_{G'} C({}^{G'}f_j - {}^{G'}p_I) = \tag{44}$$

$$^I_G C {}^G_{G'} C ({}^{G'}_G C {}^G f_j - {}^{G'}_G C {}^G P_I) = {}^I_G C({}^G f_j - {}^G p_I) = {}^I f_j = \begin{bmatrix} x \\ y \\ z \end{bmatrix}$$

$$\Rightarrow z'_j = \frac{1}{z'} \begin{bmatrix} x' \\ y' \end{bmatrix} = \frac{1}{z} \begin{bmatrix} x \\ y \end{bmatrix} = z_j \tag{45}$$

Hence, after the transformation of the global frame, image source 12 measurements do not change. This result is to be expected, because observation of image source 12 depends only on the relative position of the feature with respect to image source 12's frame, therefore the observation insensitive to any change in the global frame itself. As for IMU 16 measurements, the rotational velocity measured by the gyroscope is discussed first. Because the gyroscope measurements need to stay the same before and after the transformation of the lobal frame, e.g.:

$$\omega_m = {}^I\omega + b_g = {}^I\omega' + b'_g \tag{46}$$

by substituting (42), one obtains:

$$b'_g = b_g \tag{47}$$

Similarly, for the linear acceleration measurements from the accelerometer, from (2) and the definition that $I_\alpha = {}^I_G C {}^G \alpha_I$, the following relationship is obtained:

$$a_m = {}^I_G C({}^G a_I - {}^G g) + b_a + {}^I a - {}^I_G C {}^G g + b_a = {}^I a' - {}^I_{G'} C {}^{G'} g' + b'_a \tag{48}$$

Substituting (43) yields:

$$b'_a = b_a + {}^I_{G'} C {}^{G'} g' - {}^I_G C {}^G g \tag{49}$$

According to the definition set forth above, the gravity vector, g, is a known constant in the corresponding global frame, e.g., g is fixed with respect to the global frame. Hence, as the global frame rotates from {G} to {G'}, the gravity vector rotates simultaneously from g to g', such that:

$$^{G'}g' - {}^G g \tag{50}$$

Substituting (50) and (38) into (49), one obtains:

$$b'_a = \tag{51}$$

$$b_a + {}^I_{G'} C {}^{G'} g' - {}^I_G C {}^G g = b_a + {}^I_{G'} C {}^G g - {}^I_G C {}^G g = b_a + ({}^I_{G'} C - {}^I_G C){}^G g =$$

$$b_a + ({}^I_G C - {}^I_G C \lfloor \delta\phi \rfloor - {}^I_G C){}^G g = b_a - {}^I_G C \lfloor \delta\phi \rfloor {}^G g = b_a + {}^I_G C \lfloor {}^G g \rfloor \delta\phi$$

Collecting the equations (38), (39), (40), (41), (47), and (51), the state element changes of VINS 10 due to the rotation of the global frame, b a small angle δφ, is:

$$^I_{G'} C = (I_3 - \lfloor {}^I_G C \delta\phi \rfloor) {}^I_G C \tag{52}$$

$$b'_g = b_g$$

$$^{G'}v_I = {}^G v_I - \lfloor {}^G v_I \rfloor \delta\phi$$

$$b'_a = b_a + {}^I_G C \lfloor {}^G g \rfloor \delta\phi$$

$$^{G'}p_I = {}^G p_I - \lfloor {}^G p_I \rfloor \delta\phi$$

$$^{G'}f_j = {}^G f_j - \lfloor {}^G f_j \rfloor \delta\phi, \, j = 1, \ldots, N$$

If the original and the new error state is defined as x̃ and x̃', which correspond to the original and the new VINS state x and x', respectively, then (52) can be rewritten in the error-state form as:

$$\begin{bmatrix} {}^I\delta\theta_{G'} \\ \bar{b}'_g \\ {}^{G'}\tilde{v}_I \\ \bar{b}'_a \\ {}^{G'}\tilde{p}_I \\ {}^{G'}\tilde{f}_1 \\ \vdots \\ {}^{G'}\tilde{f}_N \end{bmatrix} = \begin{bmatrix} {}^I\delta\theta_G + {}^I_GC\delta\phi \\ \bar{b}_g \\ {}^G\tilde{v}_I - \lfloor {}^Gv_I\rfloor\delta\phi \\ \bar{b}_a + {}^I_GC\lfloor {}^Gg\rfloor\delta\phi \\ {}^G\tilde{p}_I - \lfloor {}^Gp_I\rfloor\delta\phi \\ {}^G\tilde{f}_1 - \lfloor {}^Gf_1\rfloor\delta\phi \\ \vdots \\ {}^G\tilde{f}_N - \lfloor {}^Gf_N\rfloor\delta\phi \end{bmatrix} = \begin{bmatrix} {}^I\delta\theta_G \\ \bar{b}_g \\ {}^G\tilde{v}_I \\ \bar{b}_a \\ {}^G\tilde{p}_I \\ {}^G\tilde{f}_1 \\ \vdots \\ {}^G\tilde{f}_N \end{bmatrix} + \begin{bmatrix} {}^I_GC \\ 0_{3\times 3} \\ -\lfloor {}^Gv_I\rfloor \\ {}^I_GC\lfloor {}^Gg\rfloor \\ -\lfloor {}^Gp_I\rfloor \\ -\lfloor {}^Gf_1\rfloor \\ \vdots \\ -\lfloor {}^Gf_N\rfloor \end{bmatrix}\delta\phi \quad (53)$$

Note that the matrix multiplied with $\delta\phi$ on the right-hand side is the same as in (32), hence:

$$\tilde{x}' = \tilde{x} + N_o\delta\phi \quad (54)$$

To summarize, if the global frame is rotated by a small angle 64 (as the starting point of this analysis), or equivalently, the entire trajectory of the platform and the scene are rotated by $-\delta\phi$ with respect to the global frame, then the VINS error state (and hence the state) will be changed along the direction as a linear combination of the columns of $N_o$, without changing the measurements from image source 12 or IMU 16. Moreover, it is obvious that the reverse statement holds true as well. Therefore, the directions $N_o$ in (32) are unobservable, and they correspond to the change of the 3-DOF global orientation in terms of the physical meaning. In particular, if $\delta\phi = \|\delta\phi\|e_1$, it would correspond to a rotation about the global frame's x-axis, e.g., a change in the roll angle. Similarly for the pitch and yaw angles. Hence, the three columns of $N_o$ correspond to the roll, pitch, and yaw angle change, respectively, of the orientation of the IMU frame with respect to the global frame.

The unobservable directions in (32) correspond to the global orientation (e.g., 3-DOF instead of only yaw). The global yaw unobservable direction can be expressed as $N_o{}^Gg$, which reflects the fact that the 1-DOF global yaw direction, defined as the rotation about the gravity vector $G_g$, is contained in the 3-DOF global orientation directions $N_o$. Thus, when there is no rotational motion, one cannot distinguish the direction of the local gravitational acceleration from that of the accelerometer bias, as both of them are, at least temporarily, constant. As a consequence, the roll and pitch angles become ambiguous. The motion profile considered above is the case typically followed by a robot moving on a straight line, or (for a holonomic vehicle) sliding sideways. In such cases, due to the lack of observability, the orientation estimates generated by VINS 10 become inaccurate.

Thus, moving with constant acceleration or without rotating can introduce extra unobservable directions to the VINS model. In practice, these specific motion constraints are never exactly satisfied all the time. However, when a VINS (even temporarily) approximately follows them, the VINS acquires very limited information along the unobservable directions. This may cause the information (Hessian) matrix estimated by the VINS to be ill-conditioned, or even numerically rank-deficient, thereby degrading the localization performance.

Among the two cases of unobservability, that of global orientation is the one that can be easily alleviated by allowing a conventional VINS to deviate from a straight-line path. On the other hand, rendering scale observable is challenging for a conventional VINS because it may require a conventional VINS to constantly change acceleration, which increases the wear and tear of the mobility system of the VINS.

Accordingly, and as described in more detail below, the techniques of the disclosure analytically determine the unobservable DOF of VINS 10 under special, restrictive motions. Further, VINS 10, as described herein, processes low-frequency odometric measurements from wheels 30 of VINS 10 to render scale information observable. Furthermore, VINS 10, as described herein, may compute a manifold to incorporate constraints about the motion of VINS 10 (e.g., approximately planar motion constraints) to improve the localization accuracy.

Most ground vehicles suitable for deploying VINS 10 are equipped with wheel encoders (e.g., odometer 26 of FIG. 2) that provide reliable measurements of the motion of each wheel. Such measurements may be low-frequency, noisy, and/or intermittent. However, these measurements contain scale information necessary for improving the accuracy of VINS 10 under constant-acceleration motions. In particular, the wheel-encoder data can be transformed into local 2D linear and rotational velocity measurements by employing odometer intrinsics, e.g.:

$$v = \frac{r_l w_l + r_r w_r}{2}, \quad w = \frac{r_r w_r - r_l w_l}{a} \quad (55)$$

where $w_l$, $w_r$ are the rotational velocities of the left and right wheels, respectively, $r_l$, $r_r$ are their corresponding radii, and $\alpha$ denotes the vehicle's baseline.

Given the odometry measurements of (55), the scale direction in (6) of the linearized VINS model becomes observable. For example, the odometer provides measurement of a 2-DOF planar component of the robot's linear velocity:

$$v_k = \Lambda^{O_k} v_{O_k} = \Lambda^O_I C\left({}^{I_k}_G C {}^G v_{I_k} + \lfloor \omega_m(t_k) - b_g(t_k)\rfloor {}^I p_O\right)$$

from which estimator 10 obtains the following measurement Jacobians with respect to the states involved:

$$H^O_{\delta\theta} = \Lambda^O_I C\lfloor {}^{I_k}_G C {}^G v_{I_k}\rfloor, \quad H^O_{b_g} = \Lambda^O_I C\lfloor {}^I p_O\rfloor \quad (56)$$

$$H^O_v = \Lambda^O_I C {}^{I_k}_G C$$

The odometry measurement from odometer 26 provide extra block rows in the observability matrix, in addition to the ones corresponding to observations of image source 12. From (56) and the analytical form of the state transition matrix $\Phi_{k,1}$, it can be verified that these extra block rows have the following structure:

$$M^O_k = H^O_k \Phi_{k,1} = \Gamma^O_1\left[\Gamma^O_2 \quad \Gamma^O_3 \quad {}^{I_k}_G C \quad {}^{I_k}_G C\Phi^{(3,4)}_{k,1} \quad 0_{3\times 3} \quad 0_{3\times 3}\right] \quad (57)$$

with $\Gamma^O_1 = \Lambda^O_I C$ $$\Gamma^O_2 = \lfloor {}^{I_k}_G C {}^G v_{I_k}\rfloor\Phi^{(1,1)}_{k,1} + {}^{I_k}_G C\Phi^{(3,1)}_{k,1}$$

$$\Gamma^O_3 = \lfloor {}^{I_k}_G C {}^G v_{I_k}\rfloor\Phi^{(1,2)}_{k,1} + \lfloor {}^I p_O\rfloor + {}^{I_k}_G C\Phi^{(3,2)}_{k,1}$$

for any time $t_k \geq t_0$ with $\Phi_{k,1}^{(i,j)}$ denoting the (i,j)-th block element of the state transition matrix $\Phi_{k,1}$. The scale becomes unobservable if and only if the acceleration is constant. Therefore, it suffices to show that $M_k^O N_s \neq 0$ when (5) is satisfied. Specifically:

$$M_k^O N_s = \Gamma_1^O \left( {}_G^{I_k} C^G v_{I_0} - {}_G^{I_k} C \Phi_{k,1}^{(3,4)I} a \right) \tag{58}$$

$$= \Lambda_I^O C_G^{I_k} C \left( {}^G v_{I_0} + \int_{t_0}^{t_k} {}_{I_\tau}^G C d\tau \cdot {}^I a \right) \tag{59}$$

$$= \Lambda_I^O C_G^{I_k} C^G v_{I_k} = \Lambda^{O_k} v_{I_k} \tag{60}$$

The quantity in (60) is non-zero, if the velocity of the IMU frame, expressed in the odometer frame, does not vanish along the x-y directions, e.g., if VINS 10 has translational motion along the horizontal plane. Under this condition, which is satisfied in practice as long as VINS 10 does not stay static forever, the odometer measurements of odometer 26 make the scale observable.

In particular, the linear velocity measurements of odometer 26 contain the absolute scale information. Thus, the use of odometer 26 improves the localization accuracy of VINS 10 not only by recording additional motion measurements, but primarily by providing critical information along the scale direction of VINS 10, which often becomes unobservable due to the motion of VINS 10.

In some examples, VINS 10 may be a component of or in communication with a virtual reality and/or augmented reality system. For example, VINS 10 may use state estimates computed by estimator 22 to determine and track a location within a virtual reality and/or augmented reality environment, and/or may be used to control output of text, graphics, audio, video or other information within the virtual and/or augmented environment. As one example, VINS 10 uses the computed state estimates to select contextual information and overlay such information with an image or video of a physical environment of a user. For example, if a user views a brick-and-mortar store via a mobile device, such as a smartphone or "smart" apparel (e.g., wearable electronic devices), VINS 10 may use the computed state estimates to identify the store and provide information related to the store to the user. In one example, the information may include operating hours, sales, offers, or promotions, advertisements, marketing information, contact information, prices from competing establishments, and the like. VINS 10 may overlay such information over a display (e.g., a HUD of the mobile device) to interleave real-time imagery or video of the establishment with the contextual images or video.

As another example, VINS 10 may use the computed state estimates to automatically or semi-automatically control navigation of a device, such as a robot, a vehicle, such as an automobile, ship, unmanned aerial vehicle, or drone, or a mobile computing device by outputting the position and/or instructions for navigating the environment, e.g., to a destination.

For example, VINS 10 uses the computed state estimates to determine a position and/or orientation of the device within an environment. As a further example, VINS 10 may, based on the computed state estimates, output, to the display of the device, coordinates representing the position of the device within the environment, a bearing of the device, or a direction of the device. VINS 10 may further use the computed state estimates to plot a route to a specific destination. In some examples, VINS 10 may output the route to user via the display.

As another example, VINS 10 may use the computed state estimates to compute a map of approximate positions of the features observed along the trajectory. Accordingly, the estimator described herein may allow for a VINS to efficiently approximate solutions to simultaneous localization and mapping (SLAM) solutions on a large scale. Note that VINS 10 may use the computed state estimates to efficiently compute approximate positions of the features observed along the trajectory. While the positions of the features observed along the trajectory are approximated, VINS 10 may build such a map much more efficiently as compared to conventional estimators which compute optimal positions of observed features but are much more computationally expensive, and therefore impractical for use in situations where computational resources are constrained, for example, as is the case for mobile devices or real-time mapping applications. VINS 10 may, based on the computed state estimates, output to the display coordinates representing the position of the device within the environment. VINS 10 may, based on the computed state estimates, output to the display, a map including coordinates representing approximations of positions of the features observed along the trajectory. Thus, by using an estimator as described herein, VINS 10 may be suitable for SLAM operations on resource-constrained devices, such as mobile devices. VINS 10 may further be useful to obtain approximate solutions for real-time mapping and navigation.

Figure 3:
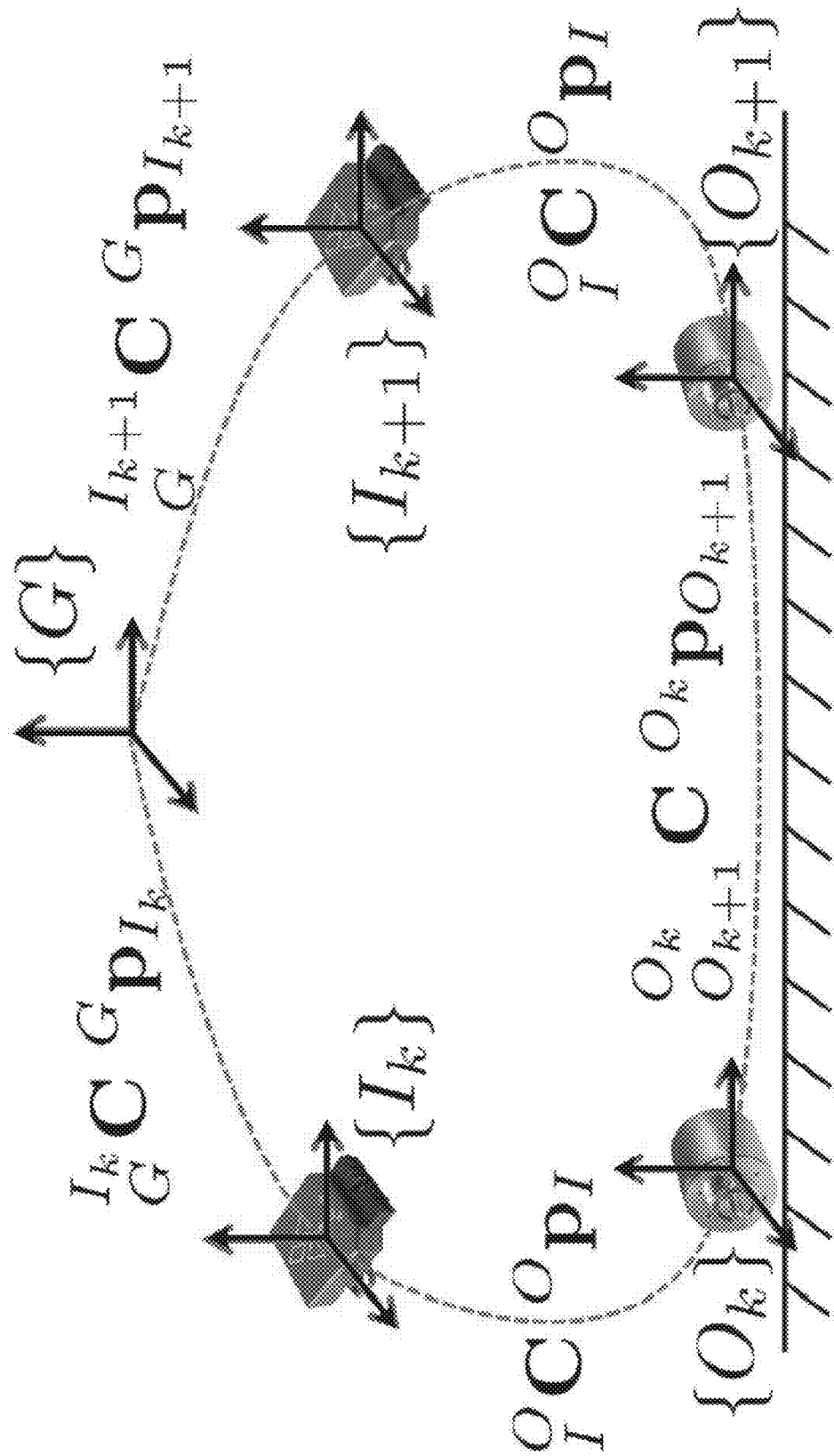
FIG. 3 is an illustration depicting an example geometric relationship between IMU frames and odometer frames of the VINS of FIG. 1 along a trajectory within an environment.

FIG. 3 is an illustration depicting an example geometric relationship between IMU frames and odometer frames of the VINS of FIG. 1 along a trajectory within an environment. For convenience, FIG. 3 is described with respect to FIG. 2.

To process the noisy data from odometer 26 in a robust manner, instead of using the velocity measurements in (55), estimator 22 integrates the odometer data and fuses the resulting 2D displacement estimates into the 3D VINS model. The measurement model implemented by estimator 22 is described below, which assumes that, between consecutive readings of odometer 26, the motion is planar. Accordingly, the transformation between two consecutive odometer frames, $\{O_k\}$ and $\{O_{k+1}\}$, involves a rotation around only the z axis by an angle $$^{O_k}\phi_{O_{k+1}}: \tag{61}$$

$$^{O_k}_{O_{k+1}}C = C_z(^{O_k}\phi_{O_{k+1}})$$

and a translation within the x-y plane, e.g., the first two elements of the translation vector $$^{O_k}p_{O_{k+1}}.$$

Integrating the linear and rotational velocities obtained from odometer 26 provides measurement to these 3-DOF quantities, e.g., $$\phi_k = {}^{O_k}\phi_{O_{k+1}} + n_\phi \tag{62}$$

$$d_k = \Lambda^{O_k} p_{O_{k+1}} + n_d, \Lambda = [e_1 \ e_2]^T \tag{63}$$

where $[n_\phi \ n_d^T$ is a 3×1 zero-mean Gaussian noise vector.

Furthermore, from the geometric constraints, the transformation between two consecutive odometer frames, at time steps k and k+1, can be written as:

$$^{O_k}_{O_{k+1}}C = {^O_I}C \; {^{I_k}_G}C \; {^{I_{k+1}}_G}C^T \; {^O_I}C^T \quad (64)$$

$$^{O_k}p_{O_{k+1}} = {^O}p_I + {^O_I}C \; {^{I_k}_G}C\left({^G}p_{I_{k+1}} - {^G}p_{I_k} - {^{I_{k+1}}_G}C^T \; {^O_I}C^{TO}p_I\right) \quad (65)$$

where ${^O_I}C$ and ${^O}p_I$ and ${^O}p_I$ are the rotation and translation of the extrinsics of odometer 16 and IMU 16, respectively.

The following sets forth the Jacobians and residuals of the corresponding measurement models to be used by estimator 22.

The Rotational Component. By equating (61) to (64), and employing small-angle approximations in the rotation matrices involved, the following error equation is obtained:

$$\delta\phi = {^O_I}C\delta\theta_{I_k} - {^O_I}C{^{I_k}_G}\hat{C}{^{I_{k+1}}_G}\hat{C}^T \delta\theta_{I_{k+1}} - n_\phi e_3 \quad (66)$$

with $\lfloor\delta\phi\rfloor = I_3 - C_z(\phi_k){^{O_k}_{O_{k+1}}}\hat{C}^T$ $$^{O_k}_{O_{k+1}}\hat{C} = {^O_I}C{^{I_k}_G}\hat{C}{^{I_{k+1}}_G}\hat{C}^T \; {^O_I}C^T$$

where $\hat{C}$ denotes the estimate of the rotation matrix C, and $\delta\theta$ is the error state of the corresponding quaternion parameterization. The third element of the vector $\delta\phi$ represents the angular error between the measured and the estimated in-plane rotation. Multiplying both sides of (66) with $e_3^T$ yields the Jacobians and residual:

$$H_{\delta\theta_{I_k}} = e_3^T {^O_I}C, \quad (67)$$

$$H_{\delta\theta_{I_{k+1}}} = -e_3^T {^O_I}C{^{I_k}_G}\hat{C}{^{I_{k+1}}_G}\hat{C}^T$$

$$r = e_3^T \delta\phi$$

The Translational Component. By substituting (65) into (63) and linearizing, the following Jacobians and residual is obtained:

$$H_{\delta\theta_{I_k}} = \Lambda{^O_I}C\lfloor\xi\rfloor, \quad (68)$$

$$H_{\delta\theta_{I_{k+1}}} = \Lambda{^O_I}C{^{I_k}_G}\hat{C}{^{I_{k+1}}_G}\hat{C}^T\lfloor{^O_I}C^{TO}p_I\rfloor$$

$$H_{p_{I_k}} = -\Lambda{^O_I}C{^{I_k}_G}\hat{C},$$

$$H_{p_{I_{k+1}}} = \Lambda{^O_I}C{^{I_k}_G}\hat{C}$$

$$r = d_k - \Lambda\left({^O}p_I + {^O_I}C\xi\right)$$

with $\xi \triangleq {^{I_k}_G}\hat{C}\left({^G}\hat{p}_{I_{k+1}} - {^G}\hat{p}_{I_k} - {^{I_{k+1}}_G}\hat{C}^{TO}_I C^{TO}p_I\right)$.

Finally, (67) and (68) represent stochastic constraints between the poses of VINS 10 and can be combined in a tightly-coupled manner into VINS estimator 22. These constraints are not assumed to be perfect, but instead may consider motions that occur outside of the plane.

The use of stochastic (e.g., "soft"), instead of deterministic (e.g., "hard") constraints, may allow VINS 10 to properly model the almost-planar motion of VINS 10. In many cases in practice, the trajectory of a moving object often lies within some manifold. Ground vehicles, for example, travel mostly on a plane, especially when navigating indoors. The knowledge of this specific motion manifold can provide additional information for improving the localization accuracy of VINS 10.

In some examples, VINS 10 may be extended to account for wheel slippage based on visual-inertial information obtained from image source 12 and IMU 16. For example, VINS 10 may compare an estimated motion from IMU frames and/or image frames with odometry data from odometer 26. If a mismatch occurs, then VINS 10 may determine that wheel slippage has occurred. If wheel slippage occurs, then estimator 22 may temporarily avoid the use of odometry data in computing constraints on the position and/or orientation of VINS 10.

The use of wheel-encoder data with VINS 10 has numerous practical applications and commercial values. For example, VINS 10, as described herein, may enhance the accuracy of localization and navigation techniques for autonomous driving and wheeled robots. Further, VINS 10, as described herein, may use odometry data to obtain scale information for state estimates, thereby improving the accuracy and robustness of the localization results for such applications. Furthermore, the use of wheel-encoder and odometry data does not require VINS 10 to have prerequisite knowledge of the environment in which VINS 10 is navigating, where there is not significant wheel slippage.

Figure 4:
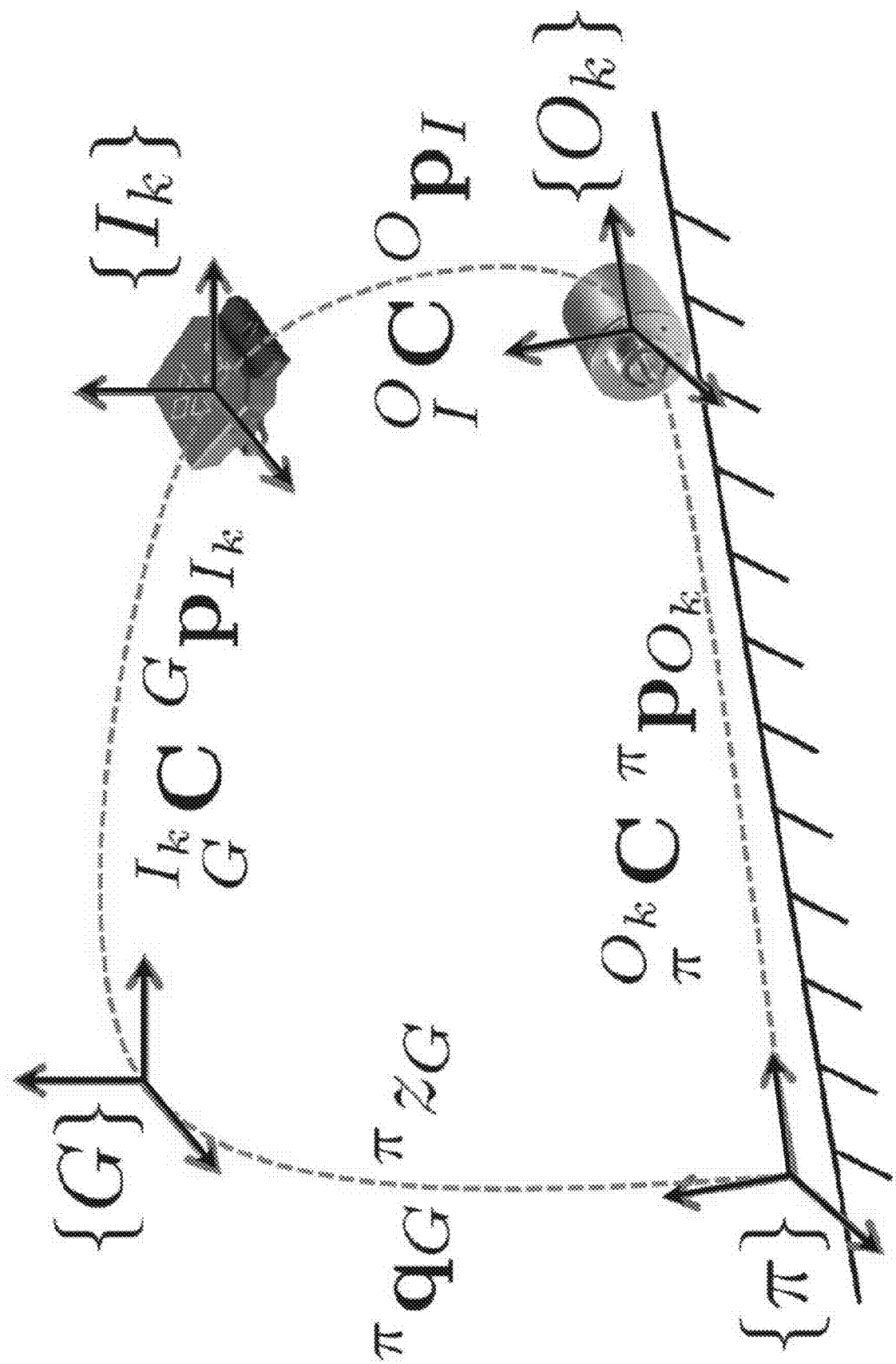
FIG. 4 is an illustration depicting an example geometric relationship between IMU frames and odometer frames of the VINS of FIG. 1 along a trajectory within a manifold.

FIG. 4 is an illustration depicting a geometric relationship between IMU frames and odometer frames of the VINS of FIG. 1 along a trajectory within a manifold. For convenience, FIG. 4 is described with respect to FIG. 2.

A motion manifold can be described mathematically as geometric constraints, $g(x)=0$, where g is, in general, a nonlinear function of the state x. This information may be incorporated as deterministic constraints or as stochastic constrains. With respect to deterministic constraints, VINS estimator 22 (e.g., a filter or a smoother) optimizes a cost function C(x) arising from the information in sensor (visual, inertial, and potentially odometric) data, while the motion manifold is described as a deterministic constraint of the optimization problem, e.g., $$\min C(x) \quad (69)$$
$$\text{s.t. } g(x) = 0$$

For VINS 10, the cost function C(x) typically takes the form of nonlinear least squares, and (69) can be solved by employing iterative Gauss-Newton minimization.

With respect to stochastic constraints, in practice, the motion manifold is never exactly satisfied. During an ideal planar motion, the roll and pitch angles remain constant. In practice, this is not the case due to vibrations of a mounting platform of VINS 10 and unevenness of surface terrain. To account for such deviations, VINS 10 uses a model of the manifold as a stochastic constraint $g(x)=n$, where n is assumed to be a zero-mean Gaussian process with covariance R, and incorporates this information as an additional cost term:

$$\min C(x) + \|g(x)\|_R^2 \quad (70)$$

Note that (70) can be solved by employing a conventional VINS estimator. Moreover, this stochastic approach (as compared to the deterministic one described above) provides more flexibility for rejecting false information due to outliers. Specifically, the Mahalanobis distance test may be used to detect and temporally remove constraints that are least likely (in the probabilistic sense) to be satisfied (e.g., when the robot goes over a bump). In some examples, the noise covariance (R in (70) above) may be tuned to reflect the tightness of the plane constraint. Thus, the noise covariance may be used as a mechanism to control the range of non-planar motion that may be accepted by the algorithm.

In one example, VINS 10 may compute a manifold. For example, VINS 10 computes a manifold corresponding to planar motion of VINS 10. The frame of the plane {n}, is defined so that the x-y plane coincides with the physical plane. The plane is parameterized with a 2-DOF quaternion, $^\pi q_G$, which represent the orientation between a plane frame and a global frame, and a scalar $^\pi Z_G$, which denotes a perpendicular distance from an origin of the global frame to the plane. The error state of the quaternion $^\pi q_G$ is defined as a 2×1 vector $\delta\theta_\pi$ so that the error quaternion is given by $$\delta q \triangleq \begin{bmatrix} \frac{1}{2}\delta\theta_\pi^T & 0 & 1 \end{bmatrix}^T.$$

Note that the parameterization agrees with the fact that a plane in the 3D space has 3-DOF. As depicted in FIG. 4, the geometric constraint of the odometer frame, {O}, moving within the lane is expressed as:

$$g(x) = \begin{bmatrix} \Lambda_I^O C_G^{I_k} C_G^\pi C^T e_3 \\ ^\pi z_G + e_{3G}^{T\pi} C\left(^G p_{I_k} - {}_G^{I_k} C_I^{T O} C^{TO} p_I\right) \end{bmatrix} = 0 \quad (71)$$

where the first block element (2×1 vector) corresponds to the planar rotational constraint, e.g., that the roll and pitch angles are zero between {n} and {O}, while the second block element (scalar) corresponds to a planar translational constraint, e.g., that the position displacement along the z-axis is zero between {n} and {O}. In some examples, algorithm (71) described above is flexible enough to incorporate other non-planar motion manifolds, allowing one to replace the geometric constraint that describes planar motion with other corresponding models.

VINS estimator 22 employs a Jacobians of the planar model, derived from (71), as set forth below. The rotational component of the Jacobians is described as:

$$H_{\delta\theta_{I_k}} = \Lambda_I^O C \begin{bmatrix} I_k \hat{C}_G^\pi \hat{C}^T e_3 \end{bmatrix} \quad (72)$$

$$H_{\delta\theta_\pi} = \Lambda_I^O C_G^{I_k} \hat{C}_G^\pi \hat{C}^T [-e_2 \ e_1]$$

The translational component of the Jacobians is described as:

$$H_{\delta\theta_{I_k}} = e_{3G}^{T\pi} \hat{C}_G^{I_k} \hat{C}^T \begin{bmatrix} O \\ I \end{bmatrix} C^{TO} p_I] \quad (73)$$

$$H_{\delta\theta_\pi} = \left(^G \hat{p}_{I_k} - {}_G^{I_k} \hat{C}^T {}_I^O C^{TO} p_I\right)^T {}_G^\pi \hat{C}^T [-e_2 \ e_1]$$

$$H_{p_{I_k}} = e_{3G}^{T\pi} \hat{C}, \ H_{z_G} = 1.$$

The techniques described herein are generic and are not restricted to any particular type of VINS estimator. In one example, estimator 22 employs a square root inverse sliding window filter (SRISWF) that is implemented with single-precision data types to obtain highly-efficient localization results on mobile devices. Estimator 22, as described herein, may be more efficient than conventional SLAM systems. For example, estimator 22 may execute in real time on a mobile device, such as a laptop, smartphone, or tablet computer. Further, estimator 22 may operate robustly in both indoor and outdoor environments.

The use of the manifold as described above may improve the accuracy of localization techniques for VINS 10. For example, the use of the manifold may allow for the deployment of a VINS system on a ground robot or vehicle that moves along a 2D plane. Furthermore, the use of VINS 10 as described herein may improve localization accuracy where VINS 10 has prior knowledge of the environment in which VINS 10 is navigating (e.g., knowledge that VINS 10 mostly moves on a single planar surface).

Figure 5:
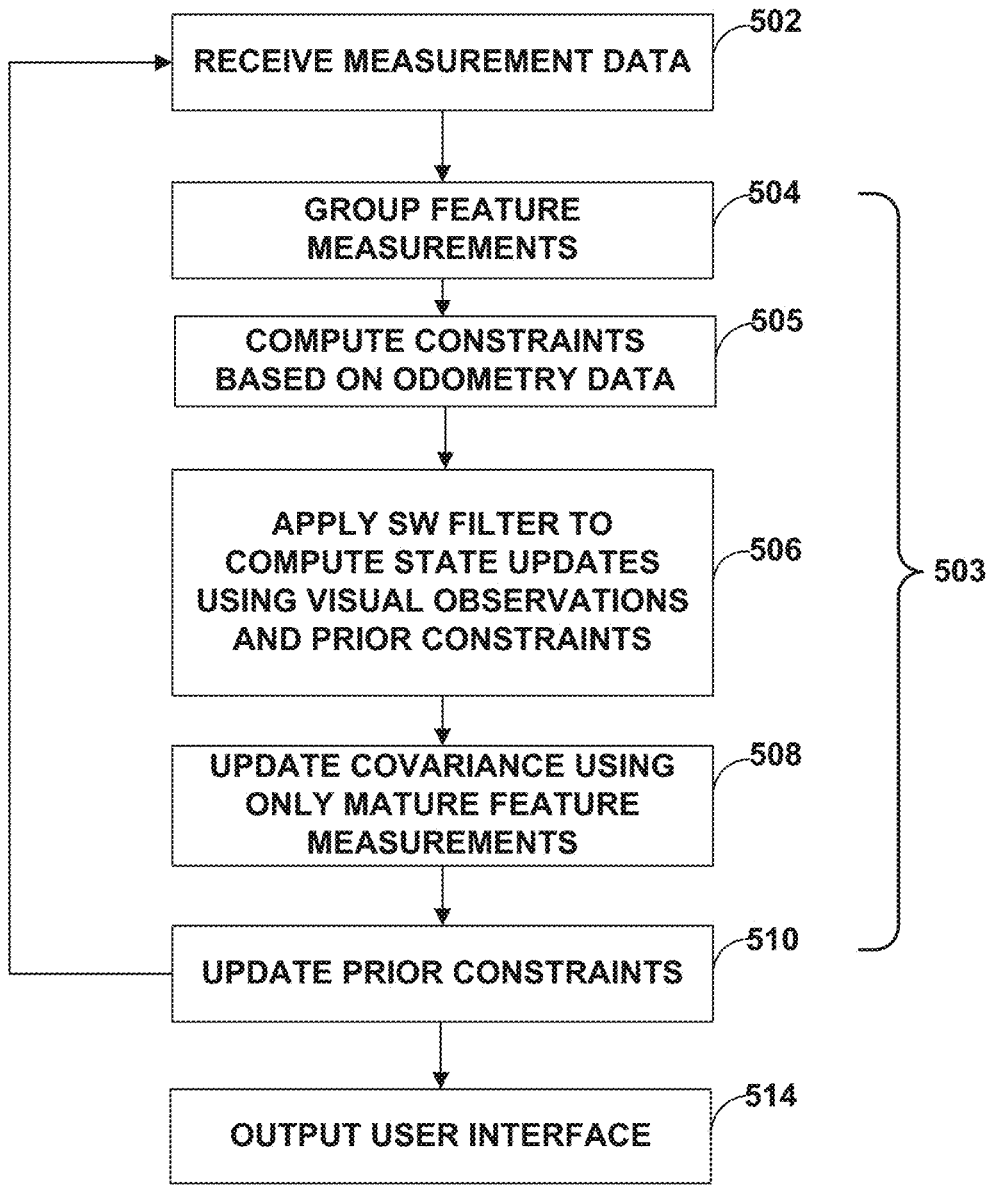
FIG. 5 is a flowchart illustrating an example operation of an estimator in accordance with the techniques described herein.

FIG. 5 is a flowchart illustrating an example operation of estimator 22 in accordance with the techniques described herein. The device may, for example, comprise a vision-aided inertial navigation system, mobile device, laptop, table, robot, a vehicle, such as an automobile, ship, unmanned aerial vehicle, or drone, server, cloud-based processing system or other device having a processor or other operating environment for implementing the techniques described herein. For purposes of explanation, FIG. 5 will be described with respect to VINS 10 and estimator 22 of FIG. 1.

During operation, estimator 22 receives measurement data observed along the trajectory (502). That is, estimator 22 receives image data 14 produced by an image source 12 of the vision-aided inertial navigation system 10 for keyframes and non-keyframes along a trajectory of the VINS. In addition, estimator 22 receives, from an inertial measurement unit (IMU) 16, IMU data 18 indicative of motion of VINS 10 along the trajectory for the keyframes and the one or more non-keyframes. Further, estimator 22 receives, from odometer 26, odometry data 28 for IMU 16 indicative of scale information for the keyframes and the one or more non-keyframes. In this way, VINS 10 receives and records, within VINS data 24, image data 14, IMU data 18, and odometry data 28 for keyframes and non-keyframes along the trajectory. Each keyframe and non-keyframe may correspond to a pose (position and orientation) of VINS 10 including landmarks (features) observed within the environment at that pose. In general, the term keyframes refers to the individual poses of the VINS for which position and orientation of the VINS are to be estimated. In contrast, the term non-keyframes refers to intermediate poses between keyframes and for which complete state estimates of the VINS are not computed. Further example details are described in U.S. patent application Ser. No. 14/271,971, entitled "CONSTRAINED KEY FRAME LOCALIZATION AND MAPPING FOR VISION-AIDED INERTIAL NAVIGATION," the entire contents of which are incorporated herein by reference.

Based on the sliding window of image data 14, IMU data 18, and odometry data 28, estimator 22 applies a sliding window filter to iteratively update a state vector to determine state estimates (linearization points) for each pose of the VINS and each landmark (503). For example, estimator 22 may update a state vector to compute state estimates for the position and the orientation of the VINS and for one or more landmarks observed from the VINS at various poses along the trajectory. In an example implementation, the state vector includes state estimates (quantities being estimated) for at least a position and orientation of the vision-aided inertial navigation system for a plurality of poses of the VINS along the trajectory. Along with the state vector, the estimator maintains uncertainty data (e.g., in the form of a Hessian matrix) for the state vector.

For example, as shown in FIG. 5, for each current time epoch, estimator 22 first determines, from the image data, feature measurements corresponding to the features observed from the poses along the trajectory and groups the feature measurements according to the features observed within the image data (504). For one or more of the features observed that were from multiple poses along the trajectory, estimator 22 computes, based on the respective group of feature measurements for the feature, one or more constraints that geometrically relate the multiple poses from which the respective feature was observed (505). Those features for which geometric constraints are computed may be viewed as MSCKF features that are excluded from the state vector by estimator 22.

In some examples, VINS 10 may undergo movement for which estimator 22 may be unable to observe using image data 14 or IMU data 18 alone. For example, such unobservable movement may include translations having constant acceleration, or zero rotation. Such unobservable movement may have the effect of rendering state estimates for position and orientation inaccurate. Further, such unobservable movement may cause error in estimating a scalar magnitude of distance between features observed by VINS 10 without affecting estimates of relative magnitudes of distance between the features observed by VINS 10.

In accordance with the techniques of the disclosure, estimator 22 uses additional information, such as odometry data 28, to generate constraints on such unobservable movement. By using the techniques of the disclosure, estimator 22 may increase the accuracy of state estimates of a position or an orientation of VINS 10. In one example, estimator 22 uses odometry data 28 to generate geometric constraints on at least one of a position or an orientation of VINS 10. For example, estimator 22 may use odometry data 28 to generate constraints on scale. For example, odometry data 28 may include wheel encoder data that indicates a distance along the trajectory traveled by VINS 10. Estimator 22 may use such odometry data 28 to generate one or more constraints that impose scalar distance relationships between the multiple poses from which the respective feature was observed. Thus, the use of odometry data 28 to generate constraints to the position or orientation of VINS 10 may assist VINS 10 in determining scale by constraining estimates of distances between the approximated positions of observed features, where conventional systems may be only able to determine relative distances between the approximated positions of observed features.

Accordingly, by using the techniques of the disclosure, a VINS may account for unobservable directions when determining state estimates for a position or an orientation of the VINS. In some examples, such unobservable directions include scale, constant acceleration, or zero rotation translations. Thus, the techniques of the disclosure may allow a VINS to achieve significantly higher positioning accuracy over conventional systems. Further, the techniques of the disclosure may allow the VINS to maintain such high accuracy with reduced computational complexity. Thus, a VINS in accordance with the techniques of the disclosure may be able to perform mapping and navigational functions in real-time or on low-resource devices, such as consumer electronics and mobile devices.

Next, filter 23 of estimator 22 applies a sliding window update to update, within the sliding window, each of the state estimates for the VINS and for the features using the IMU data captured throughout the sliding window as VINS 10 moves along the trajectory and the image data obtained at the plurality of poses (506). For example, estimator 22 applies the sliding window to recompute, based on updated state data within the sliding window, the state estimates for the VINS and for the positions of the features with the environment, as represented within the state vector, using (1) the IMU data and the image data associated with features observed at any of the plurality of poses within the sliding window, and (2) the set of computed prior constraints linearly constraining the state estimates for the poses. In some examples, estimator 22 utilizes features associated with all poses within the sliding window. In other examples, estimator 22 may utilizes the budgeting techniques described herein to apply an estimation policy for deciding, which measurements will be processed based on the available computational resources the current sliding window update.

Next, estimator 22 updates, for each of the state estimates, the respective covariance (e.g., uncertainty data) (508). As described herein, estimator 22 may maintain the uncertainty data in the form of a Hessian matrix.

In addition, estimator 22 computes updates for the set of prior constraints to be used in the next iteration (510). Based on the computed state estimates, estimator 22 may further output a navigation user interface, e.g., a map, e.g., a 2D or 3D map, of the environment overlaid with the position and/or orientation of the frame of reference (514). The map may, for example, construct the user interface to include position and orientation information for the VINS along the trajectory relative to position information for any landmarks observed by the VINS. The map may further include position information for features observed along the trajectory. The user interface may be displayed, stored, used for subsequent navigation and the like.

Further, in some examples, estimator 22 performs loop closure to reduce error in the approximated mapping solutions. As described above, estimator 22 may allow VINS 10 to efficiently build a map including approximate positions of features observed along the trajectory as VINS 10 traverses the environment. Loop closure refers to a process wherein, upon returning to a previously mapped location (e.g., completing a "loop" of mapped terrain), estimator 22 of VINS 10 uses corresponding IMU data and image data associated with observed features at the previously mapped location to update the state vector and reduce accumulated uncertainty data in the state estimates. Thus, estimator 22 may use loop closure to allow VINS 10 to efficiently build the map of approximate positions of observed features and further increase accuracy in the approximated positions of observed features.

Figure 6:
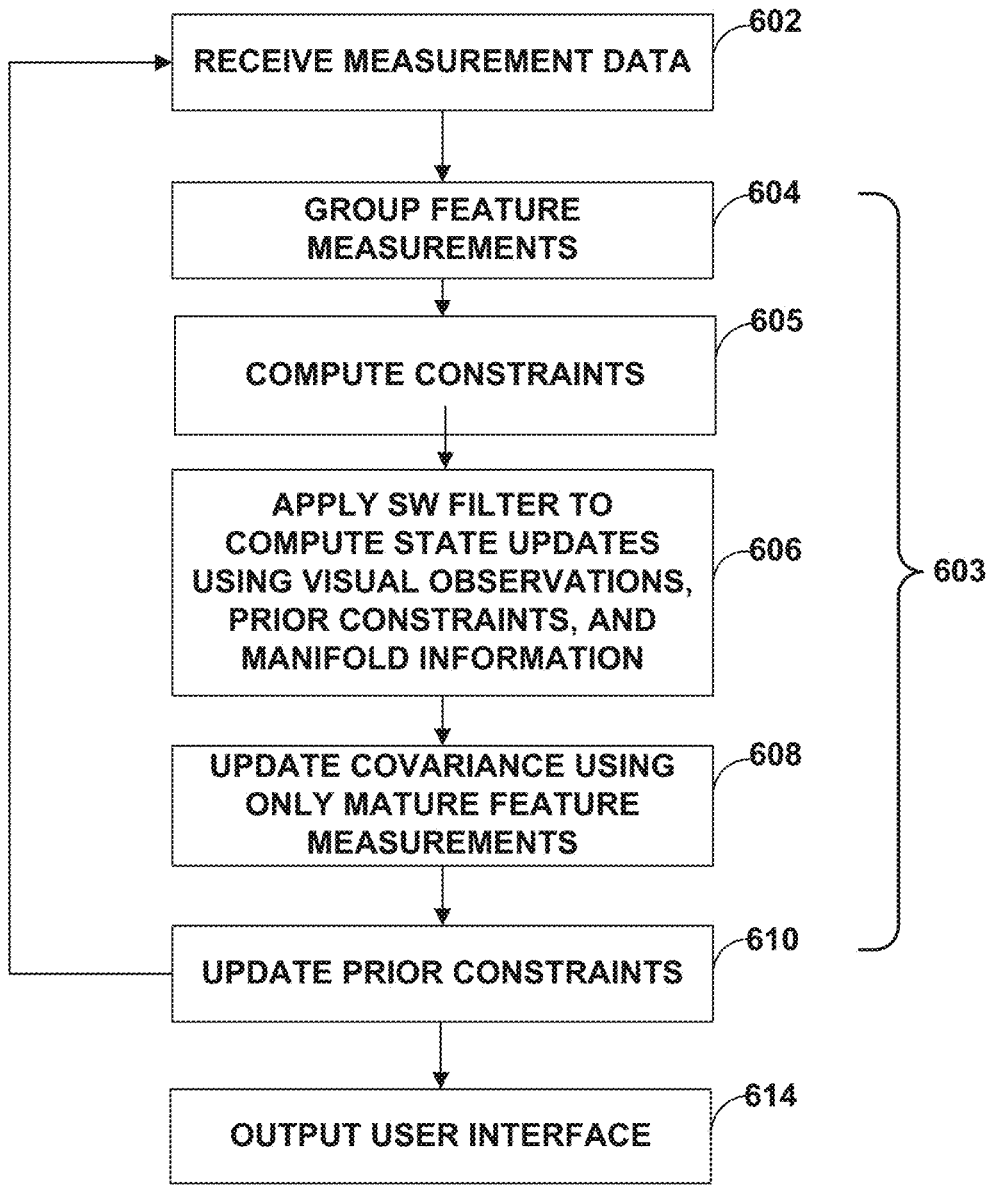
FIG. 6 is a flowchart illustrating an example operation of an estimator in accordance with the techniques described herein.

FIG. 6 is a flowchart illustrating an example operation of estimator 22 in accordance with the techniques described herein. The device may, for example, comprise a vision-aided inertial navigation system, mobile device, laptop, table, robot, a vehicle, such as an automobile, ship, unmanned aerial vehicle, or drone, server, cloud-based processing system or other device having a processor or other operating environment for implementing the techniques described herein. For purposes of explanation, FIG. 6 will be described with respect to VINS 10 and estimator 22 of FIG. 1.

The operation illustrated by FIG. 6 may operate in a similar fashion to the operation illustrated by FIG. 6. For example, during operation, estimator 22 receives measurement data observed along the trajectory (602), which may occur in a substantially similar fashion as 502 of FIG. 5. Based on the sliding window of image data 14 and IMU data 18, estimator 22 applies a sliding window filter to iteratively update a state vector to determine state estimates (linearization points) for each pose of the VINS and each landmark (603), which may occur in a substantially similar fashion as 503 of FIG. 5. Further, for each current time epoch, estimator 22 first determines, from the image data, feature measurements corresponding to the features observed from the poses along the trajectory and groups the feature measurements according to the features observed within the image data (604), which may occur in a substantially similar fashion as 504 of FIG. 5. For one or more of the features observed that were from multiple poses along the trajectory, estimator 22 computes, based on the respective group of feature measurements for the feature, one or more constraints that geometrically relate the multiple poses from which the respective feature was observed (605), which may occur in a substantially similar fashion as 505 of FIG. 5. Those features for which geometric constraints are computed may be viewed as MSCKF features that are excluded from the state vector by estimator 22.

Next, filter 23 of estimator 22 applies a sliding window update to update, within the sliding window, each of the state estimates for the VINS and for the features using the IMU data captured throughout the sliding window as VINS 10 moves along the trajectory and the image data obtained at the plurality of poses (606).

In some examples, VINS 10 may undergo movement for which estimator 22 may be unable to observe using image data 14 or IMU data 18 alone. For example, such unobservable movement may include translations having constant acceleration, or zero rotation. Such unobservable movement may have the effect of rendering state estimates for position and orientation inaccurate. Further, such unobservable movement may cause error in estimating a scalar magnitude of distance between features observed by VINS 10 without affecting estimates of relative magnitudes of distance between the features observed by VINS 10.

In accordance with the techniques of the disclosure, estimator 22 uses additional information, such as a motion manifold, to generate constraints on such unobservable movement. By using the techniques of the disclosure, estimator 22 may increase the accuracy of state estimates of a position or an orientation of VINS 10. For example, a typical VINS system, such as VINS 10, may predominantly travel across an approximately flat surface. Estimator 22 may use a motion manifold (e.g., a two-dimensional planar motion data within the environment) to determine constraints on estimates of a position or orientation of VINS 10. Estimator 22 may use such a motion manifold to generate one or more constraints that impose planar relationships between the multiple poses from which the respective feature was observed. Thus, the use of the motion manifold to generate constraints to the position or orientation of VINS 10 may further assist VINS 10 in increasing an accuracy of estimates of at least one of a position or an orientation of VINS 10, or an accuracy of approximated positions of observed features.

As one example, estimator 22 may compute an optimization to a cost function that incorporates the motion manifold as a deterministic constraint. In some examples, estimator 22 may compute the optimization by applying an iterative Gauss-Newton minimization to a nonlinear least squares equation. Estimator 22 may apply the optimization as a constraint to a state estimate of a position or orientation of VINS 10.

As one example, estimator 22 may compute an optimization to a stochastic cost function that incorporates the motion manifold as an additional cost term. In some examples, estimator 22 may compute the optimization to the nonlinear least squares equation by applying a Mahalanobis distance test to a zero-mean Gaussian process. Estimator 22 may apply the optimization as a constraint to a state estimate of a position or orientation of VINS 10.

Thus, estimator 22 applies the sliding window to recompute, based on updated state data within the sliding window, the state estimates for the VINS and for the positions of the features with the environment, as represented within the state vector, using (1) the IMU data and the image data associated with features observed at any of the plurality of poses within the sliding window, and (2) the set of computed prior constraints linearly constraining the state estimates for the poses. In some examples, estimator 22 utilizes features associated with all poses within the sliding window. In other examples, estimator 22 may utilizes the budgeting techniques described herein to apply an estimation policy for deciding, which measurements will be processed based on the available computational resources the current sliding window update.

Next, estimator 22 updates, for each of the state estimates, the respective covariance (e.g., uncertainty data) (608), which may occur in a substantially similar fashion as 508 of FIG. 5. As described herein, estimator 22 may maintain the uncertainty data in the form of a Hessian matrix.

In addition, estimator 22 computes updates for the set of prior constraints to be used in the next iteration (610), which may occur in a substantially similar fashion as 610 of FIG. 5. Based on the computed state estimates, estimator 22 may further output a navigation user interface, e.g., a map, e.g., a 2D or 3D map, of the environment overlaid with the position and/or orientation of the frame of reference (614), which may occur in a substantially similar fashion as 514 of FIG. 5. The map may, for example, construct the user interface to include position and orientation information for the VINS along the trajectory relative to position information for any landmarks observed by the VINS. The map may further include position information for features observed along the trajectory. The user interface may be displayed, stored, used for subsequent navigation and the like.

Further, in some examples, estimator 22 performs loop closure to reduce error in the approximated mapping solutions. As described above, estimator 22 may allow VINS 10 to efficiently build a map including approximate positions of features observed along the trajectory as VINS 10 traverses the environment. Loop closure refers to a process wherein, upon returning to a previously mapped location (e.g., completing a "loop" of mapped terrain), estimator 22 of VINS 10 uses corresponding IMU data and image data associated with observed features at the previously mapped location to update the state vector and reduce accumulated uncertainty data in the state estimates. Thus, estimator 22 may use loop closure to allow VINS 10 to efficiently build the map of approximate positions of observed features and further increase accuracy in the approximated positions of observed features.

Accordingly, by using the techniques of the disclosure, a VINS may account for unobservable directions when determining state estimates for a position or an orientation of the VINS. In some examples, such unobservable directions include scale, constant acceleration, or zero rotation translations. Thus, the techniques of the disclosure may allow a VINS to achieve significantly higher positioning accuracy over conventional systems. Further, the techniques of the disclosure may allow the VINS to maintain such high accuracy with reduced computational complexity. Thus, a VINS in accordance with the techniques of the disclosure may be able to perform mapping and navigational functions in real-time or on low-resource devices, such as consumer electronics and mobile devices.

Figure 7:
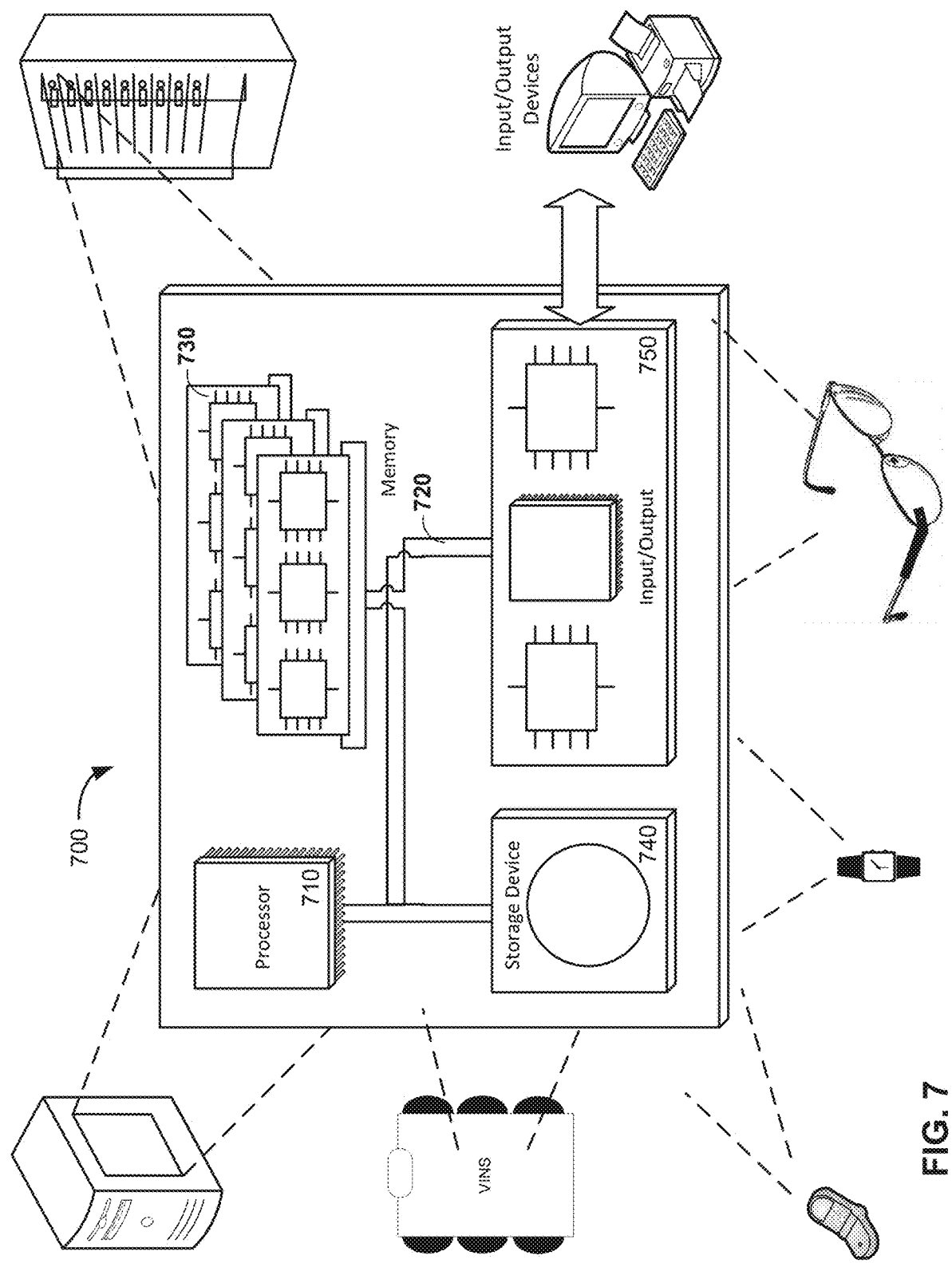
FIG. 7 is an illustrating depicting a detailed example of various devices that may be configured to implement some embodiments in accordance with the techniques described herein. Like reference characters refer to like elements throughout the figures and description.

FIG. 7 is an illustrating depicting a detailed example of various devices that may be configured to implement some embodiments in accordance with the current disclosure. For example, device 700 may be a robot, mobile sensing platform, a mobile phone, a wearable device such as a smartphone or smart watch, a workstation, a computing center, a cluster of servers or other example embodiments of a computing environment, centrally located or distributed, capable of executing the techniques described herein. Any or all of the devices may, for example, implement portions of the techniques described herein for vision-aided inertial navigation systems.

In this example, a computer 700 includes a hardware-based processor 710 that may be implemented within VINS 10 or any device to execute program instructions or software, causing the computer to perform various methods or tasks, such as performing the techniques described herein. Processor 710 may be a general purpose processor, a digital signal processor (DSP), a core processor within an Application Specific Integrated Circuit (ASIC) and the like. Processor 710 is coupled via bus 720 to a memory 730, which is used to store information such as program instructions and other data while the computer is in operation. A storage device 740, such as a hard disk drive, nonvolatile memory, or other non-transient storage device stores information such as program instructions, data files of the multidimensional data and the reduced data set, and other information. As another example, computer 700 may provide an operating environment for execution of one or more virtual machines that, in turn, provide an execution environment for software for implementing the techniques described herein.

The computer also includes various input-output elements 750, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The following examples may illustrate one or more aspects of the disclosure.

Example 1. A vision-aided inertial navigation system (VINS) comprising: at least one image source configured to produce image data along a trajectory of the VINS within an environment, wherein the image data contains a plurality of features observed within the environment at a plurality of poses of the VINS along the trajectory; an inertial measurement unit (IMU) configured to produce IMU data indicative of motion of the VINS; an odometry unit configured to produce odometry data for the IMU, the odometry data indicative of scale information; and a hardware-based processor communicatively coupled to the image source, the IMU, and the odometry unit, the processor configured to compute, based on the image data, the IMU data, and the odometry data, state estimates for at least a position and orientation of the VINS for the plurality of poses of the VINS along the trajectory, wherein the processor computes the state estimates by: classifying, for each pose of the poses, each of the features observed at the pose into either a first set of the features or a second set of the features, maintaining a state vector having states for a position and orientation of the VINS and for positions within the environment for the first set of features for a sliding window of two or more of the most recent poses along the trajectory without maintaining states for positions of the second set of features within the state vector, and applying a sliding window filter to compute, based on the second set of features and the odometry data, constraints between the poses within the sliding window and compute, based on the constraints, the state estimates within the state vector for the sliding window.

Example 2. The VINS of example 1, wherein, to apply the sliding window filter to compute, based on the second set of features and the odometry data, the constraints between the poses within the sliding window, the processor is further configured to apply the sliding window filter to compute, based on the second set of features and the odometry data, a rotational component and a translational component that represent some of the constraints between the poses within the sliding window.

Example 3. The VINS of any of examples 1 through 2, wherein the VINS comprises at least one wheel, and wherein the odometry data comprises wheel encoder data for the at least one wheel.

Example 4. The VINS of any of examples 1 through 3, wherein the processor is further configured to compute each of the constraints between the poses as an estimate of motion between the poses within the sliding window, and a covariance indicating an uncertainty of the estimated motion.

Example 5. The VINS of any of examples 1 through 4, wherein the processor is further configured to classify the first set of the features as simultaneous localization and mapping (SLAM) features for computing the state estimates and the second set of features as Multi-state Constraint Kalman Filter (MSCKF) features for computing the constraints.

Example 6. The VINS of any of examples 1 through 5, wherein the processor is configured to apply the sliding window filter by, for each update of the state estimates within the state vector, computing a Hessian matrix that excludes at least a portion of the second features set, wherein the Hessian matrix represents a subset of the IMU data and the image data along the trajectory, and wherein the processor is configured to update the state estimates based on the Hessian matrix.

Example 7. A method comprising: producing, by at least one image source of a vision-aided inertial navigation system (VINS), image data along a trajectory of the VINS within an environment, wherein the image data contains a plurality of features observed within the environment at a plurality of poses of the VINS along the trajectory; producing, by an inertial measurement unit (IMU) of the VINS, IMU data indicative of motion of the VINS; producing, by an odometry unit of the VINS, odometry data for the IMU, the odometry data indicative of scale information; and computing, by a hardware-based processor communicatively coupled to the image source, the IMU, and the odometry unit and based on the image data, the IMU data, and the odometry data, state estimates for at least a position and orientation of the VINS for the plurality of poses of the VINS along the trajectory, wherein computing the state estimates comprises: classifying, for each pose of the poses, each of the features observed at the pose into either a first set of the features or a second set of the features, maintaining a state vector having states for a position and orientation of the VINS and for positions within the environment for the first set of features for a sliding window of two or more of the most recent poses along the trajectory without maintaining states for positions of the second set of features within the state vector, and applying a sliding window filter to compute, based on the second set of features and the odometry data, constraints between the poses within the sliding window and compute, based on the constraints, the state estimates within the state vector for the sliding window.

Example 8. The method of example 7, wherein applying the sliding window filter to compute, based on the second set of features and the odometry data, the constraints between the poses within the sliding window comprises applying the sliding window filter to compute, based on the second set of features and the odometry data, a rotational component and a translational component that represent some of the constraints between the poses within the sliding window.

Example 9. The method of any of examples 7 through 8, wherein the VINS comprises at least one wheel, and wherein the odometry data comprises wheel encoder data for the at least one wheel.

Example 10. The method of any of examples 7 through 9, further comprising computing each of the constraints between the poses as an estimate of motion between the poses within the sliding window, and a covariance indicating an uncertainty of the estimated motion.

Example 11. The method of any of examples 7 through 10, further comprising classifying the first set of the features as simultaneous localization and mapping (SLAM) features for computing the state estimates and the second set of features as Multi-state Constraint Kalman Filter (MSCKF) features for computing the constraints.

Example 12. The method of any of examples 7 through 11, further comprising: applying the sliding window filter by, for each update of the state estimates within the state vector, computing a Hessian matrix that excludes at least a portion of the second features set, wherein the Hessian matrix represents a subset of the IMU data and the image data along the trajectory, and updating the state estimates based on the Hessian matrix.

Example 13. A vision-aided inertial navigation system (VINS) comprising: at least one image source configured to produce image data along a trajectory of the VINS within an environment, wherein the image data contains a plurality of features observed within the environment at a plurality of poses of the VINS along the trajectory; an inertial measurement unit (IMU) configured to produce IMU data indicative of motion of the VINS; and a hardware-based processor communicatively coupled to the image source and the IMU, the processor configured to compute, based on the image data and the IMU data, state estimates for at least a position and orientation of the VINS for the plurality of poses of the VINS along the trajectory, wherein the processor computes the state estimates by: classifying, for each of the poses, each of the features observed at the respective pose into either a first set of the features or a second set of the features, maintaining a state vector having states for a position and orientation of the VINS and for positions within the environment for the first set of features for a sliding window of two or more of the most recent poses along the trajectory without maintaining states for positions of the second set of features within the state vector, applying a sliding window filter to compute, based on the second set of features, constraints between the poses within the sliding window and compute, based on the constraints and a motion manifold that provides one or more geometric constraints for the trajectory, the state estimates within the state vector for the sliding window.

Example 14. The VINS of example 13, wherein the motion manifold is a two-dimensional plane and the one or more geometric constraints for the trajectory comprise planar motion constraints.

Example 15. The VINS of any of examples 13 through 14, wherein, to compute, based on the second set of features and the motion manifold, the constraints between the poses within the sliding window, the processor is further configured to: compute an optimization to a cost function that incorporates the motion manifold as a deterministic constraint; and compute, based on the second set of features and the optimization to the cost function, the constraints between the poses within the sliding window.

Example 16. The VINS of any of examples 13 through 15, wherein, to compute, based on the second set of features and the motion manifold, the constraints between the poses within the sliding window, the processor is further configured to: compute an optimization to a stochastic cost function that incorporates the motion manifold as an additional cost term; and compute, based on the second set of features and the optimization to the stochastic cost function, the constraints between the poses within the sliding window.

Example 17. A method comprising: producing, by at least one image source of a vision-aided inertial navigation system (VINS), image data along a trajectory of the VINS within an environment, wherein the image data contains a plurality of features observed within the environment at a plurality of poses of the VINS along the trajectory; producing, by an inertial measurement unit (IMU) of the VINS, IMU data indicative of motion of the VINS; computing, by a hardware-based processor communicatively coupled to the image source and the IMU and based on the image data and the IMU data, state estimates for at least a position and orientation of the VINS for the plurality of poses of the VINS along the trajectory, wherein computing the state estimates comprises: classifying, for each of the poses, each of the features observed at the respective pose into either a first set of the features or a second set of the features, maintaining a state vector having states for a position and orientation of the VINS and for positions within the environment for the first set of features for a sliding window of two or more of the most recent poses along the trajectory without maintaining states for positions of the second set of features within the state vector, applying a sliding window filter to compute, based on the second set of features, constraints between the poses within the sliding window and compute, based on the constraints and a motion manifold that provides one or more geometric constraints for the trajectory, the state estimates within the state vector for the sliding window.

Example 18. The method of example 17, wherein the motion manifold is a two-dimensional plane and the one or more geometric constraints for the trajectory comprise planar motion constraints.

Example 19. The method of any of examples 17 through 18, wherein, to compute, based on the second set of features and the motion manifold, the constraints between the poses within the sliding window, the processor is further configured to: compute an optimization to a cost function that incorporates the motion manifold as a deterministic constraint; and compute, based on the second set of features and the optimization to the cost function, the constraints between the poses within the sliding window.

Example 20. The method of any of examples 17 through 19, wherein, to compute, based on the second set of features and the motion manifold, the constraints between the poses within the sliding window, the processor is further configured to: compute an optimization to a stochastic cost function that incorporates the motion manifold as an additional cost term; and compute, based on the second set of features and the optimization to the stochastic cost function, the constraints between the poses within the sliding window.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A vision-aided inertial navigation system (VINS) comprising:
at least one image source configured to produce image data along a trajectory of the VINS within an environment, wherein the image data contains a plurality of features observed for a plurality of poses of the VINS along the trajectory;
an inertial measurement unit (IMU) configured to produce IMU data indicative of motion of the VINS; and
a processor communicatively coupled to the at least one image source and the IMU, wherein the processor is configured to derive state estimates by:
maintaining a state vector for a sliding window of two or more most recent poses of the VINS;
generating:
a set of one or more motion estimate geometric constraints between poses within the sliding window based on a first set of features of the plurality of features, and
the state estimates within the state vector for the sliding window based on the set of one or more motion estimate geometric constraints;
computing a motion manifold for the environment based on the state estimates;
using the motion manifold to generate a set of one or more motion manifold geometric constraints, wherein the set of one or more motion manifold geometric constraints are used to constrain the motion of the VINS within a particular range of deviation from planar motion; and
updating the state estimates according to the set of one or more motion estimate geometric constraints and the set of one or more motion manifold geometric constraints.

2. The VINS of claim 1, wherein generating at least one of the set of one or more motion estimate geometric constraints or the state estimates within the state vector is done using a sliding window filter that is selected from the group consisting of a Multi-state Constraint Kalman Filter (MSCKF), an Inverse Sliding-Window Filter (ISWF), and an Iterative Kalman Smoother (IKS).

3. The VINS of claim 1, wherein:
the VINS further comprises an odometry unit configured to produce odometry data;
the odometry data is indicative of scale information corresponding to movement of the VINS along the trajectory; and
the processor is configured to generate at least one of the set of one or more motion estimate geometric constraints and the set of one or more motion manifold geometric constraints based, at least in part, on the odometry data.

4. The VINS of claim 3, wherein the processor is further configured to compute, based, at least in part, on the first set of features and the odometry data, a rotational component and a translational component that represents at least some of the state estimates.

5. The VINS of claim 1, wherein the processor is further configured to update at least one of:
the state estimates according to:
an estimated motion based on the first set of features, and
a covariance indicating an uncertainty of the estimated motion;
the uncertainty of the estimated motion by computing a Hessian matrix, wherein the Hessian matrix represents a subset of the IMU data and the image data along the trajectory; or
the state estimates based on the Hessian matrix.

6. The VINS of claim 1, wherein maintaining the state vector comprises:

maintaining states for positions within the environment for a second set of features without maintaining states for positions of the first set of features within the state vector; and classifying the second set of features as simultaneous localization and mapping (SLAM) features for generating the state estimates.

7. The VINS of claim 1, wherein:
the motion manifold is a two-dimensional plane; and
the set of one or more motion manifold geometric constraints comprise a planar-motion constraint.

8. The VINS of claim 1, wherein updating the state estimates comprises:
computing an optimization to a stochastic cost function that incorporates the motion manifold as a deterministic constraint; and
applying the optimization to the state estimates.

9. The VINS of claim 1, wherein the VINS is an autonomous robot selected from the group consisting of: an automobile, a ship, and an unmanned aerial vehicle.

10. A non-transitory computer-readable medium comprising instructions that, when executed, are configured to cause a processor to perform a process for vision-aided inertial navigation, the process comprising:
obtaining:
image data along a trajectory of a system within an environment, from at least one image source, wherein the image data contains a plurality of features observed for a plurality of poses of the system along the trajectory, and
inertial measurement unit (IMU) data, indicative of motion of the system;
maintainina a state vector for a sliding window of two or more most recent poses along the trajectory;
generating:
a set of one or more motion estimate geometric constraints between poses within the sliding window based on a first set of features of the plurality of features, and
state estimates within the state vector for the sliding window based on the set of one or more motion estimate geometric constraints;
computing a motion manifold for the environment based on the state estimates;
using the motion manifold to generate a set of one or more motion manifold geometric constraints, wherein the set of one or more motion manifold geometric constraints are used to constrain the motion of the VINS within a particular range of deviation from planar motion; and
updating the state estimates according to the set of one or more motion estimate geometric constraints and the set of one or more motion manifold geometric constraints.

11. The non-transitory computer-readable medium of claim 10, wherein maintaining the state vector comprises:
maintaining states for positions within the environment for a second set of features without maintaining states for positions of the first set of features within the state vector; and classifying the second set of features as simultaneous localization and mapping (SLAM) features for generating the state estimates.

12. The non-transitory computer-readable medium of claim 10, wherein generating at least one of the set of one or more motion estimate geometric constraints or the state estimates within the state vector is done using a sliding window filter that is selected from the group consisting of a Multi-state Constraint Kalman Filter (MSCKF), an Inverse Sliding-Window Filter (ISWF), and an Iterative Kalman Smoother (IKS).

13. The non-transitory computer-readable medium of claim 10, wherein the process further comprises obtaining, from an odometry unit, odometry data, wherein:
the odometry data is indicative of scale information corresponding to movement of the system along the trajectory; and
generating at least one of the set of one or more motion estimate geometric constraints and the set of one or more motion manifold geometric constraints is based, at least in part, on the odometry data.

14. The non-transitory computer-readable medium of claim 13, wherein the process further comprises computing, based, at least in part, on the first set of features and the odometry data, a rotational component and a translational component that represents at least some of the state estimates.

15. The non-transitory computer-readable medium of claim 10, wherein the process further comprises updating at least one of:
the state estimates according to:
an estimated motion based on the first set of features, and
a covariance indicating an uncertainty of the estimated motion;
the uncertainty of the estimated motion by computing a Hessian matrix, wherein the Hessian matrix represents a subset of the IMU data and the image data along the trajectory; and
the state estimates based on the Hessian matrix.

16. The non-transitory computer-readable medium of claim 10, wherein:
the motion manifold is a two-dimensional plane; and
the set of one or more motion manifold geometric constraints comprises a planar-motion constraint.

17. The non-transitory computer-readable medium of claim 10, wherein updating the state estimates comprises:
computing an optimization to a stochastic cost function that incorporates the motion manifold as a deterministic constraint; and
applying the optimization to the state estimates.

18. The non-transitory computer-readable medium of claim 10, wherein the system is an autonomous robot selected from the group consisting of: an automobile, a ship, and an unmanned aerial vehicle.

* * * * *

UNITED STATES PATENT AND TRADEMARK OFFICE
CERTIFICATE OF CORRECTION

| | | |
|---|---|---|
| PATENT NO. | : 12,442,638 B2 | Page 1 of 1 |
| APPLICATION NO. | : 18/443035 | |
| DATED | : October 14, 2025 | |
| INVENTOR(S) | : Stergios I. Roumeliotis et al. | |

It is certified that error appears in the above-identified patent and that said Letters Patent is hereby corrected as shown below:

On the Title Page

Item (72) Inventors: add --Georgios Georgiou, San Francisco, CA (US)-- after "Chao Guo, Minneapolis, MN (US)".

Signed and Sealed this
Ninth Day of December, 2025

John A. Squires
*Director of the United States Patent and Trademark Office*